US012639185B2

(12) United States Patent
Hvozdovic et al.

(10) Patent No.: US 12,639,185 B2
(45) Date of Patent: May 26, 2026

(54) SYSTEMS AND METHODS FOR DETERMINING SYSTEM INTERMEDIATE AND OUTPUT VALUES WITH PARTIALLY DEFINED SYSTEM INPUT VALUES

(71) Applicant: Honeywell International Inc., Charlotte, NC (US)

(72) Inventors: Jan Hvozdovic, Prague (CZ); Devesh Bhatt, Maple Grove, MN (US); Edward Schlossmacher, Phoenix, AZ (US); Nagaraj Mugaluru Srinivasaiah, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 106 days.

(21) Appl. No.: 18/625,905

(22) Filed: Apr. 3, 2024

(65) Prior Publication Data

US 2025/0252025 A1      Aug. 7, 2025

(30) Foreign Application Priority Data

Feb. 7, 2024     (IN) .............................. 202411008331

(51) Int. Cl.
*G06F 11/00* (2006.01)
*G06F 11/263* (2006.01)
(52) U.S. Cl.
CPC .................................. *G06F 11/263* (2013.01)
(58) Field of Classification Search
CPC .................................................... G06F 11/263
See application file for complete search history.

(56) References Cited

U.S. PATENT DOCUMENTS 7,490,319 B2 *   2/2009   Blackwell ........... G06F 11/3698
                                                              717/124
7,805,398 B1     9/2010   Yang
                          (Continued)

FOREIGN PATENT DOCUMENTS

EP          2874065 B1     4/2017

OTHER PUBLICATIONS

Beohar et al., "Input-output conformance testing for software product lines", Journal of Logical and Algebraic Methods in Programming, 85 (2016), Sep. 29, 2016, pp. 1131 through 1153.
(Continued)

*Primary Examiner* — Amine Riad
(74) *Attorney, Agent, or Firm* — Fogg & Powers LLC

(57)          ABSTRACT

In one example, a method includes receiving one or more test scenarios based on requirements for a system under test having one or more inputs, wherein a value for at least one input of the one or more inputs is undefined for at least one test scenario of the one or more test scenarios. The method further includes determining system intermediate values and system output values that are unambiguously derivable from defined system inputs for the one or more test scenarios. The defined system inputs are defined in the one or more test scenarios and not assumed or default input values. The method further includes determining coverage of one or more functional characteristics of each function of the system under test executed based on the defined system inputs. The method further includes validating the determined system output values that are unambiguously derivable from the defined system inputs.

20 Claims, 17 Drawing Sheets

TEST VECTORS 105

SYSTEM 100

PROCESSOR(S) 102

MEMORY 104

INTERMEDIATE AND OUTPUT VALUE INSTRUCTIONS 106

COVERAGE TOOL INSTRUCTIONS 108

VALIDATION TOOL INSTRUCTIONS 110

COVERAGE REPORT(S) 112

VALIDATION REPORT(S) 114

(56)                References Cited

U.S. PATENT DOCUMENTS

| | | | |
|---|---|---|---|
| 9,098,619 | B2 | 8/2015 | Bhatt et al. |
| 9,208,046 | B2 * | 12/2015 | Pasala ..................... G06F 11/26 |
| 10,331,509 | B2 | 6/2019 | Brillout et al. |
| 10,691,586 | B2 | 6/2020 | Nuotio et al. |
| 2005/0096861 | A1 | 5/2005 | Ur et al. |
| 2020/0301815 | A1 | 9/2020 | Mola |

OTHER PUBLICATIONS

European Patent Office, "Extended European Search Report", dated Jul. 10, 2025, from EP Application No. 25151742.1, from Foreign Counterpart to U.S. Appl. No. 18/625,905, pp. 1 through 11, Published: EP.

\* cited by examiner

TEST VECTORS 105

SYSTEM 100

PROCESSOR(S) 102

MEMORY 104

INTERMEDIATE AND OUTPUT VALUE INSTRUCTIONS 106

COVERAGE TOOL INSTRUCTIONS108

VALIDATION TOOL INSTRUCTIONS 110

COVERAGE REPORT(S) 112

VALIDATION REPORT(S) 114

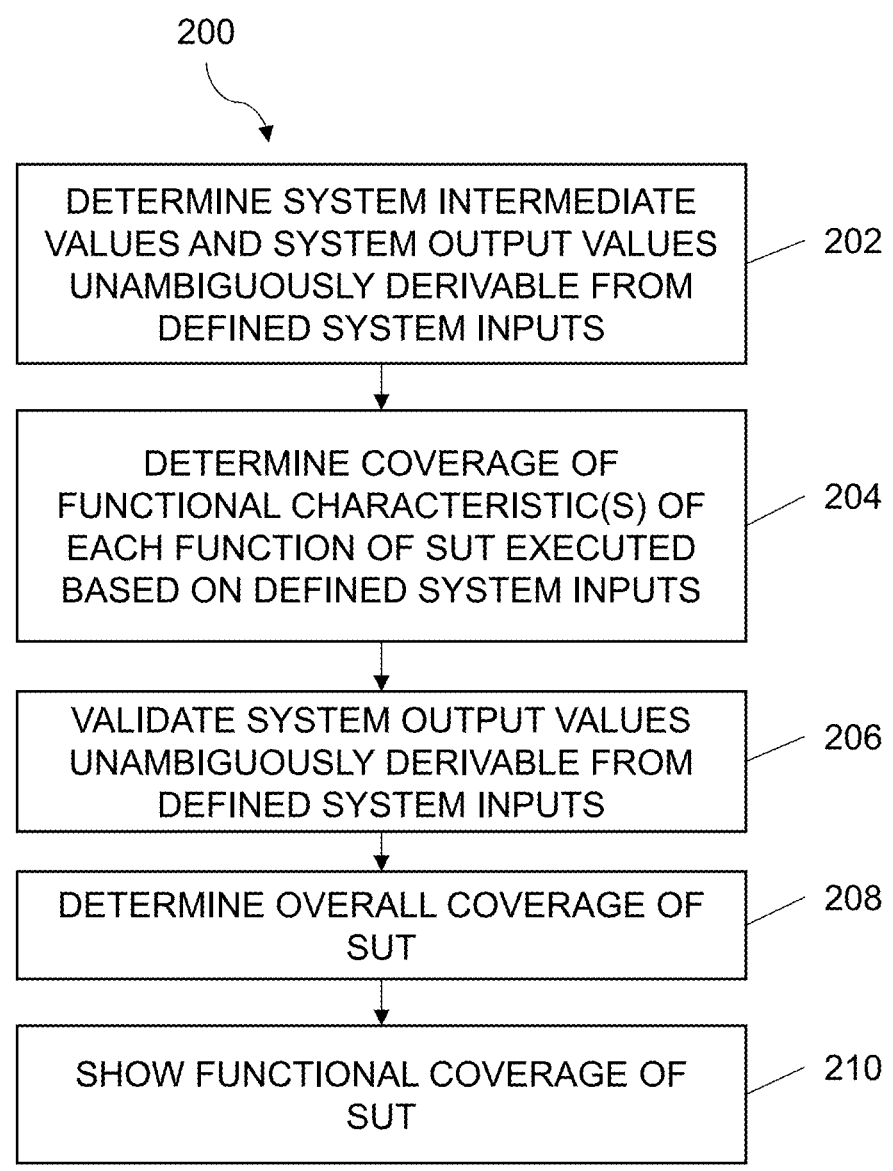

200

DETERMINE SYSTEM INTERMEDIATE VALUES AND SYSTEM OUTPUT VALUES UNAMBIGUOUSLY DERIVABLE FROM DEFINED SYSTEM INPUTS — 202

DETERMINE COVERAGE OF FUNCTIONAL CHARACTERISTIC(S) OF EACH FUNCTION OF SUT EXECUTED BASED ON DEFINED SYSTEM INPUTS — 204

VALIDATE SYSTEM OUTPUT VALUES UNAMBIGUOUSLY DERIVABLE FROM DEFINED SYSTEM INPUTS — 206

DETERMINE OVERALL COVERAGE OF SUT — 208

SHOW FUNCTIONAL COVERAGE OF SUT — 210

| Execution steps | Inputs | | | | | | | | | Outputs |
| | switch3_ctrl | switch_in1 | enc_in1 | switch_in2 | mswitch_in3 | enc_in2 | mswitch_in2 | switch_ctrl | and5_in2 | sampleH old_out |
|---|---|---|---|---|---|---|---|---|---|---|
| Initialize | | | | | | | | | | |
| 1 | 0 | 1000 | X | X | X | X | X | 1 | X | 1000 |
| 1 | 0 | -1000 | X | X | X | X | X | 1 | 0 | -1000 |
| 1 | 0 | -1000 | X | X | X | X | X | 1 | 0 | -1000 |
| 1 | 0 | 1000 | X | X | X | X | X | 1 | 1 | -1000 |

| Block fullpath | MaskType | HLR-MCA-ReqCoverage | LLR and Derived-ReqCoverage | Any derived requirement? | (All reqs derived?) |
|---|---|---|---|---|---|
| and5 v(0) | And (HW) | 100.000 | 66.667 | no | |
| encoder v(0) | Encoder (HW) | 0.000 | 0.000 | no | |
| multiportSwitch v(0) | Multiport Switch (HW) | 0.000 | 0.000 | no | |
| and3 v(0) | Not (HW) | 50.000 | 50.000 | no | |
| sampleAndHold v(0) | Sample And Hold (HW) | 66.667 | 66.667 | no | |
| sum v(0) | Sum (HW) | 0.000 | 0.000 | no | |
| switch v(0) | Switch (HW) | 0.000 | 0.000 | no | |
| switch3 v(0) | Switch (HW) | 0.000 | 0.000 | no | |

Figures 6B, 6C:
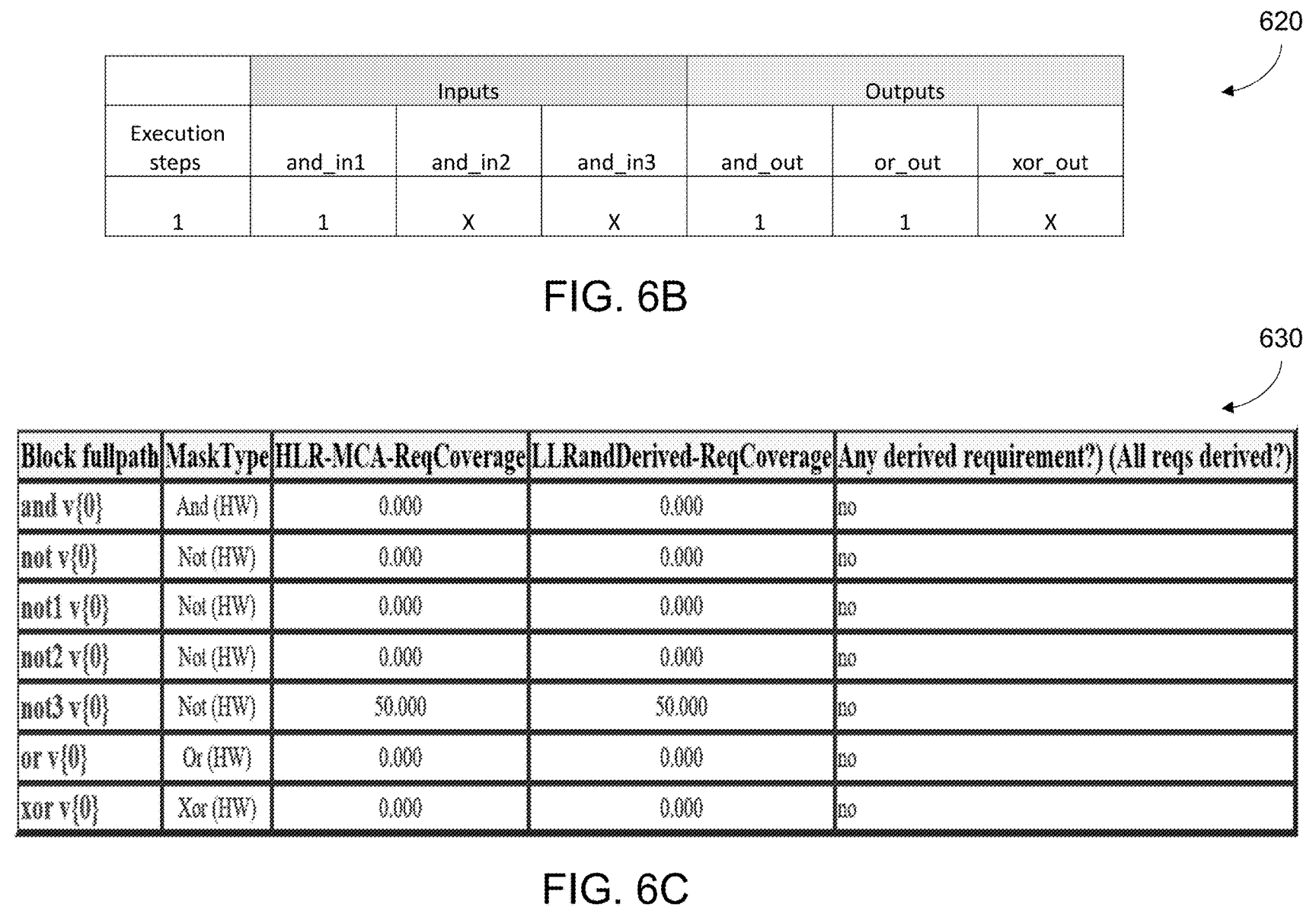

| Execution steps | Inputs | | | Outputs | | |
|---|---|---|---|---|---|---|
| | and_in1 | and_in2 | and_in3 | and_out | or_out | xor_out |
| 1 | 1 | X | X | 1 | 1 | X |

| Block fullpath | MaskType | HLR-MCA-ReqCoverage | LLR and Derived-ReqCoverage | Any derived requirement? (All reqs derived?) |
|---|---|---|---|---|
| and_y{0} | And (HW) | 0.000 | 0.000 | no |
| not_y{0} | Not (HW) | 0.000 | 0.000 | no |
| not1_y{0} | Not (HW) | 0.000 | 0.000 | no |
| not2_y{0} | Not (HW) | 0.000 | 0.000 | no |
| not3_y{0} | Not (HW) | 50.000 | 50.000 | no |
| or_y{0} | Or (HW) | 0.000 | 0.000 | no |
| xor_y{0} | Xor (HW) | 0.000 | 0.000 | no |

| Execution steps | Inputs | | | | Outputs |
| | varDebounceOff In | varDebounceOff Ton | varDebounceOff Toff | varDebounceOff IC | varDebounceOff Out |
|---|---|---|---|---|---|
| 1 | 1 | X | 0.00E+00 | 1 | 1 |
| 1 | 0 | 0.00E+00 | X | 1 | 0 |
| Initialize | | | | | |
| 1 | X | 37 | X | 1 | 1 |

| Block fullpath | MaskType | HLR-MCA-ReqCoverage | LLR and Derived-ReqCoverage | Any derived requirement? (All reqs derived?) |
|---|---|---|---|---|
| gain v{0} | Gain (HW) | NA | 0.000 | no |
| gain1 v{0} | Gain (HW) | NA | 0.000 | no |
| not v{0} | Not (HW) | NA | 100.000 | no |
| not1 v{0} | Not (HW) | NA | 100.000 | no |
| not2 v{0} | Not (HW) | NA | 0.000 | no |
| varDebounceOff v{0} | Variable Reset Debounce (HW) | NA | 83.333 | no |

| Execution steps | Inputs | Outputs |
|---|---|---|
| | delay_in | delay_out |
| 1 | X | 6 |
| 1 | 100 | X |
| 1 | X | 300 |

| Block fullpath | MaskType | HLR-MCA-ReqCoverage | LLR and Derived-ReqCoverage | Any derived requirement? | (All reqs derived?) |
|---|---|---|---|---|---|
| gain v{0} | Gain (HW) | 100.000 | 100.000 | no | |
| simpleDelay v{0} | Simple Delay (HW) | 100.000 | 100.000 | no | |

| Execution steps | Inputs | Outputs |
|---|---|---|
| | Input | Output |
| 1 | X | 0 |
| 7 | 1 | X |
| 1 | 1 | 1 |
| 1 | X | 1 |
| 1 | X | 1 |
| 5 | 0 | X |
| 1 | 0 | 0 |

| Block fullpath | MaskType | HLR-MCA-ReqCoverage | LLRandDerived-ReqCoverage | Any derived requirement? | (All reqs derived?) |
|---|---|---|---|---|---|
| debounce_ICON v{0} | Debounce {HW} | 0.000 | 0.000 | no | |

FIG. 9C

```
bool varDebounceOff(bool inputValue, float Ton, float Toff, bool IC)
{
  if (IC) {
    lastOutput = 0;
    counter = 0;
    contCounting = true;
    return lastOutput;
  }
  else if (inputValue && (Ton == 0)) {
    lastOutput = 1;
    return lastOutput;
  }
  else if (!inputValue && (Toff == 0)) {
    lastOutput = 0;
    return lastOutput;
  } float time = (lastOutput) ? Toff : Ton;
  float debounceTime = (float)ceil(((time < 0.0F) ? 0.0F : time) * rate);
  unsigned int tmpCounter;
  if (contCounting || (lastOutput != inputValue))
  {
    tmpCounter = counter + 1;
  }
  else
  {
    tmpCounter = 0;
  }
  bool expiredCounter = (tmpCounter > debounceTime);
  if (expiredCounter)
  {
    lastOutput = inputValue;
  }
  contCounting = !(expiredCounter || IC);
  counter = tmpCounter;
  return lastOutput;
}
```

FIG. 10

SYSTEMS AND METHODS FOR DETERMINING SYSTEM INTERMEDIATE AND OUTPUT VALUES WITH PARTIALLY DEFINED SYSTEM INPUT VALUES

CROSS-REFERENCE TO RELATED APPLICATION

This application claims priority to Indian Provisional Patent Application No. 202411008331, filed on Feb. 7, 2024, and titled "SYSTEMS AND METHODS FOR DETERMINING SYSTEM INTERMEDIATE AND OUTPUT VALUES WITH PARTIALLY DEFINED SYSTEM INPUT VALUES," the contents of which are incorporated herein by reference in their entirety.

BACKGROUND

The computation of intermediate and output values of a system is used to study system behaviors and analyze which parts of the system implementation are exercised during testing. Typically, a flight control system or other type of large system can have hundreds of inputs and outputs. Existing methods of computing intermediate and output values of a system, which include simulation and code execution, require all input values of the system to be defined or in a known state otherwise default input values are assumed for any undefined inputs. Existing methods also produce all intermediate and output values for a system regardless of whether all of the system inputs have been defined and regardless of whether the intermediate and output values are impacted by the defined input values or the default input values assumed for any undefined inputs.

For testing and verification of a system, testing vectors or testing scenarios are created to test system behaviors, and it is desirable to know whether specific inputs are impacting particular outputs and only the particular outputs that are intended. When the existing methods discussed above are used, the complexity of the testing scenarios is quite high because all of the system input values need to be defined or default values are assumed for the execution of the testing scenario. When default values are assumed for undefined inputs and all output values for the system are determined, it is very difficult and time consuming to determine what system outputs are impacted by specific inputs and whether the impacted outputs are those desired for operation.

For the reasons above, and for other reasons provided below, there is a need for improved techniques for determining system intermediate values and output values, validating system outputs, and determining coverage for a system.

SUMMARY

In some aspects, a method is described. The method includes receiving one or more test scenarios based on requirements for a system under test having one or more inputs, wherein a value for at least one input of the one or more inputs is undefined for at least one test scenario of the one or more test scenarios. The method further includes determining system intermediate values and system output values that are unambiguously derivable from defined system inputs for the one or more test scenarios. The defined system inputs are defined in the one or more test scenarios and not assumed or default input values. The method further includes determining coverage of one or more functional characteristics of each function of the system under test executed based on the defined system inputs. The method further includes validating the determined system output values that are unambiguously derivable from the defined system inputs.

In some aspects, a system is described. The system includes an input configured to receive information about a system under test. The system under test includes one or more inputs, wherein a value for at least one input of the one or more inputs is undefined for at least one test vector of one or more test vectors based on requirements for the system under test. The system under test further includes one or more functions, wherein each function of the one or more functions is configured to a generate respective intermediate value based, at least in part, on a value of at least one of the one or more inputs. The system under test further includes one or more outputs, wherein each output of the one or more outputs is configured to provide an output value based, at least in part, on at least one of the respective intermediate values. The system further includes one or more computational elements communicatively coupled to a memory. The one or more are configured to determine intermediate values and output values that are unambiguously derivable from defined system inputs for the one or more test vectors. The defined system inputs are defined in the one or more test vectors and not assumed or default input values. The one or more computational elements are configured to determine coverage of one or more functional characteristics of each of the one or more functions dependent on only the defined system inputs. The one or more computational elements are configured to validate the system output values determined from only the defined system inputs.

In some aspects, a system is described. The system includes one or more processors and a non-transitory, computer readable medium communicatively coupled to the one or more processors. The non-transitory, computer readable medium stores instructions which, when executed by the one or more processors, cause the one or more processors to receive one or more test vectors based on requirements for a system under test. The system under test includes one or more inputs, one or more functions configured to a generate respective intermediate value based on a value of at least one of the one or more inputs, and one or more outputs configured to provide an output value based on at least one of the respective intermediate values. The non-transitory, computer readable medium stores instructions which, when executed by the one or more processors, cause the one or more processors to determine system intermediate values and system output values that are unambiguously derivable from input values defined in the one or more test vectors. The input values defined in the one or more test vectors are not assumed or default input values, and an input value for at least one input of the one or more inputs is undefined for at least one test vector of the one or more test vectors. The non-transitory, computer readable medium stores instructions which, when executed by the one or more processors, cause the one or more processors to determine coverage of one or more functional characteristics of each function of the system under test executed based on the input values defined in the one or more test vectors; and validate the determined system output values that are unambiguously derivable from the input values defined in the one or more test vectors.

BRIEF DESCRIPTION OF THE DRAWINGS

Embodiments of the present invention can be more easily understood and further advantages and uses thereof more readily apparent, when considered in view of the description and the following figures in which:

FIG. 2 is a flow diagram of an example method of evaluating a system under test;

FIG. 5B is a table of example input/output values for the example system in FIG. 5A;

FIG. 5C is an example coverage report for the example system and input values in FIGS. 5A-5B;

FIG. 6B is a table of example input/output values for the example system in FIG. 6A;

FIG. 6C is an example coverage report for the example system and input values in FIGS. 6A-6B;

FIG. 7B is a table of example input/output values for the example system in FIG. 7A;

FIG. 7C is an example coverage report for the example system and input values in FIGS. 7A-7B;

FIG. 8B is a table of example input/output values for the example system in FIG. 8A;

FIG. 8C is an example coverage report for the example system and input values in FIGS. 8A-8B;

FIG. 9B is a table of example input/output values for the example system in FIG. 9A;

FIG. 9C is an example coverage report for the example system and input values in FIGS. 9A-9B; and FIG. 10 illustrates example code for a function of an example system under test.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The systems and methods described herein allow for simplified testing vectors/scenarios and verification to be performed easily when only a subset of the inputs is defined for the system. The systems and methods described herein include determining a subset of system intermediate values and system output values from only system inputs defined in a testing vector/scenario without using assumed default input values for undefined system inputs. The systems and methods described herein also determine coverage of one or more functional characteristics of each function of the system dependent on only the defined system inputs and validate the system output values determined from only the defined system inputs.

Figure 1:
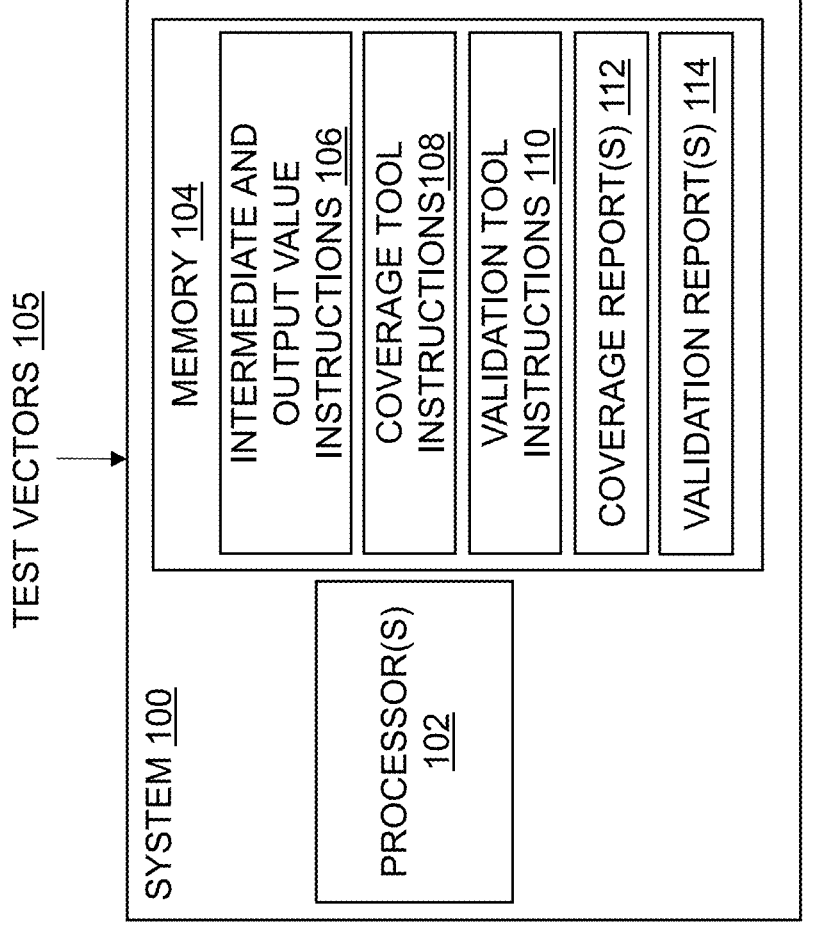
FIG. 1 is a block diagram of an example system.

FIG. 1 is a block diagram of an example system 100 in which the techniques described herein can be implemented. In the example shown in FIG. 1, the system 100 includes one or more processors 102 and at least one memory 104. In the example shown in FIG. 1, the at least one memory 104 includes intermediate and output value instructions 106, coverage tool instructions 108, and validation tool instructions 110.

While the intermediate and output value instructions 106, the coverage tool instructions 108, and the validation tool instructions 110 are described as separate with respect to the system 100 of FIG. 1, it should be understood that they can be combined into a tool used to evaluate a system under test. Further, while the intermediate and output value instructions 106, the coverage tool instructions 108, and the validation tool instructions 110 are shown as being stored in the same memory 104 in FIG. 1, it should be understood that they can be stored in different memories 104 as well.

The system 100 is configured to evaluate system designs based on partially defined inputs. In particular, the system 100 is configured to generate intermediate values and system output values from partially defined input values, determine coverage of system functions, and validate the system outputs generated from the partially defined input values.

In some examples, the system 100 is also used to generate the system under test. For example, the system 100 can be used to generate software code that is to be evaluated using the system 100. In such examples, the system 100 is aware of the inputs, functions, topology, and outputs of the system under test.

In some examples, the system 100 is configured to evaluate the system under test in a simulation environment. In some examples, the system 100 is configured to simulate the features of the system under test in software. In some examples, the system under test can be simulated as a model, for example, using MATLAB SIMULINK, SCADE, or another simulation tool.

In other examples, the system 100 is only used to evaluate the system under test, and is not used for generating the system under test. In such examples, the details about the system under test including inputs, functions, topology information between the inputs and functions, and outputs are provided to the system 100 prior to evaluation.

In the example shown in FIG. 1, the system 100 is configured to receive test vectors 105 (also referred to herein as "test scenarios") that are used to test various functionality of the system under test. In some examples, the test vectors 105 are provided to the system 100 via user input (for example, via file upload or manual entry into a user interface of the system 100). In some examples, the test vectors 105 include defined input values for a subset of the system inputs, output values that should be produced by the system for the particular input values, and the number of execution steps. At least one of the test vectors 105 for a particular system under test includes an input that is undefined for at least one execution step. In some examples, at least one of the test vectors 105 for a particular system under test includes an output that is undefined for at least one execution step. When inputs and outputs are undefined for a particular test vector 105, those inputs and outputs are marked as undefined for the purposes of evaluation by the system 100 rather than using or assuming a default value for the inputs and outputs. It should be understood that the inputs and outputs could also be marked as unknown, undetermined, indefinite, or a similar term to undefined rather than using or assuming a default value for the inputs and outputs. The term "undefined" is used herein and should be understood to cover these various alternative markings as well.

The one or more processors 102 are configured to execute the intermediate and output value instructions 106 to generate the intermediate values and output values according to the test vectors 105. As discussed in more detail below, the system 100 is configured to determine intermediate values output by functions of the system under test that are unambiguously determined from the defined input values and not based on any assumed values or default values for undefined system inputs in the test vectors 105. Similarly, the system 100 is configured to determine output values that are and output values of the system under test that are unambiguously determined from the defined input values and not based on any assumed values or default values for system inputs that are undefined in the test vectors 105.

In some examples, the intermediate and output value instructions 106, when executed by the one or more processors 102, cause the one or more processors 102 to determine intermediate values from the defined input values from the test vectors 105 in topological order until reaching either an output value or an intermediate value that cannot be computed (for example, due to insufficient information for the inputs of a function). In such examples, intermediate values determined from the defined system inputs, alone or in conjunction with other intermediate values, are used to determine the subsequent dependent values (intermediate values or output values). The determination is repeated until a full subset of intermediate values and output values that are unambiguously derivable from the defined system inputs is determined.

It should be noted that one or more of the intermediate values and system output values can be unambiguously determined even if no input values are defined for a particular execution step in the test vectors 105 in some examples. For example, the system under test can include a function that can determine an intermediate value unambiguously even when the input is undefined. An example of this type of scenario is discussed further below with respect to FIGS. 9A-9C.

The one or more processors 102 are configured to execute the coverage tool instructions 108 to generate one or more coverage reports 112. The coverage reports 112 can indicate whether functionality for particular functions of the system under test was exercised based on the values defined in the test vectors. Example coverage reports 112 are discussed below. The coverage tool instructions 108, when executed by the one or more processors 102, cause the one or more processors 102 to determine the coverage for functionality of the system under test that has been executed during the test vectors 105. In some examples, the coverage tool instructions 108, when executed by the one or more processors 102, cause the one or more processors 102 to determine a percentage of the functionality for particular functions of the system under test that has been executed for the test vectors 105.

The one or more processors 102 are configured to execute the validation tool instructions 110 to generate validation reports 114. The validation reports 114 can indicate whether or not the desired outputs defined in the test vectors were observed. The validation tool instructions 110, when executed by the one or more processors 102, cause the one or more processors 102 to determine whether the outputs generated during execution of the intermediate and output value instructions 106 are valid. In some examples, the validation tool instructions 110, when executed by the one or more processors 102, cause the one or more processors 102 to compare the defined outputs in the test vectors 105 with the outputs generated during the execution of the intermediate and output value instructions 106.

FIG. 2 illustrates a flow diagram of an example method 200 of evaluating a system under test (abbreviated SUT in FIG. 2). The common features discussed above with respect to the example system in FIG. 1 can include similar characteristics to those discussed with respect to method 200 and vice versa. In some examples, the blocks of the method 200 are performed by system 100 described above.

The blocks of the flow diagram in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel in an event-driven manner).

The method 200 includes determining system intermediate values and system output values unambiguously derivable from defined system inputs (block 202). The system intermediate values are values output by functions of the system but that are not output values of the system under test. In other words, system intermediate values are values determined by functions of the system during execution of the testing vectors, but the values are then input into another function of the system rather than being output by the system. The system output values are values that are determined by functions and output by the system under test.

The system inputs are defined in the test vectors that are used to evaluate the system under test and are not assumed or default values. In some examples, the number of system inputs defined in the test vectors is less than the total number of system inputs and at least one of the inputs is undefined for at least one of the test vectors. In some examples, the system intermediate values and system output values are based on a history of values of the defined system inputs over time for the multiple test vectors.

In some examples, the defined system inputs are propagated to functions of the system under test in topological order. System inputs that are not defined are marked as undefined. The inputs that are marked undefined are not propagated to the functions of the system and thus do not contribute to the system intermediate values or the system output values that are determined. Even if a particular function receives both defined inputs and inputs that are not defined, a system intermediate value can be generated using the function as long as the output of the function can be unambiguously determined using only the values of defined system inputs propagated to the function.

The process for determining system intermediate values and system output values is further discussed with respect to FIG. 3 below.

The method 200 further includes determining coverage of one or more functional characteristics of each function of the system under test executed based on the defined system inputs (block 204). In some examples, determining coverage of one or more functional characteristics of each function of the system executed based on the defined system inputs includes determining what percentage of total functionality for each function of the system under test is executed based on the defined system inputs.

The method 200 further includes validating the system output values unambiguously derivable from the defined system inputs (block 206). In some examples, validating the system output values includes determining whether the system output values unambiguously derivable from the defined system inputs match the output values defined in the test vectors for the particular defined system inputs. If the values match, then the system output values unambiguously derivable from the defined system inputs are considered to be valid. If the values do not match, the system output values unambiguously derivable from the defined system inputs are considered to be invalid, which can trigger a notification to the system designer that the system under test and/or the test vectors required modification.

In some examples, the method 200 optionally includes determining overall coverage of the system (block 208). In some examples, determining the overall coverage of the system includes combining the results of multiple evaluations of the system under test where different test vectors include different combinations of defined system inputs and result in execution of different functionality of the system under test being exercised.

In some examples, the method 200 optionally includes showing functional coverage of the system (block 210). In some examples, the functional coverage of the system is shown to a user via a display device, in a report, or the like.

Figure 3:
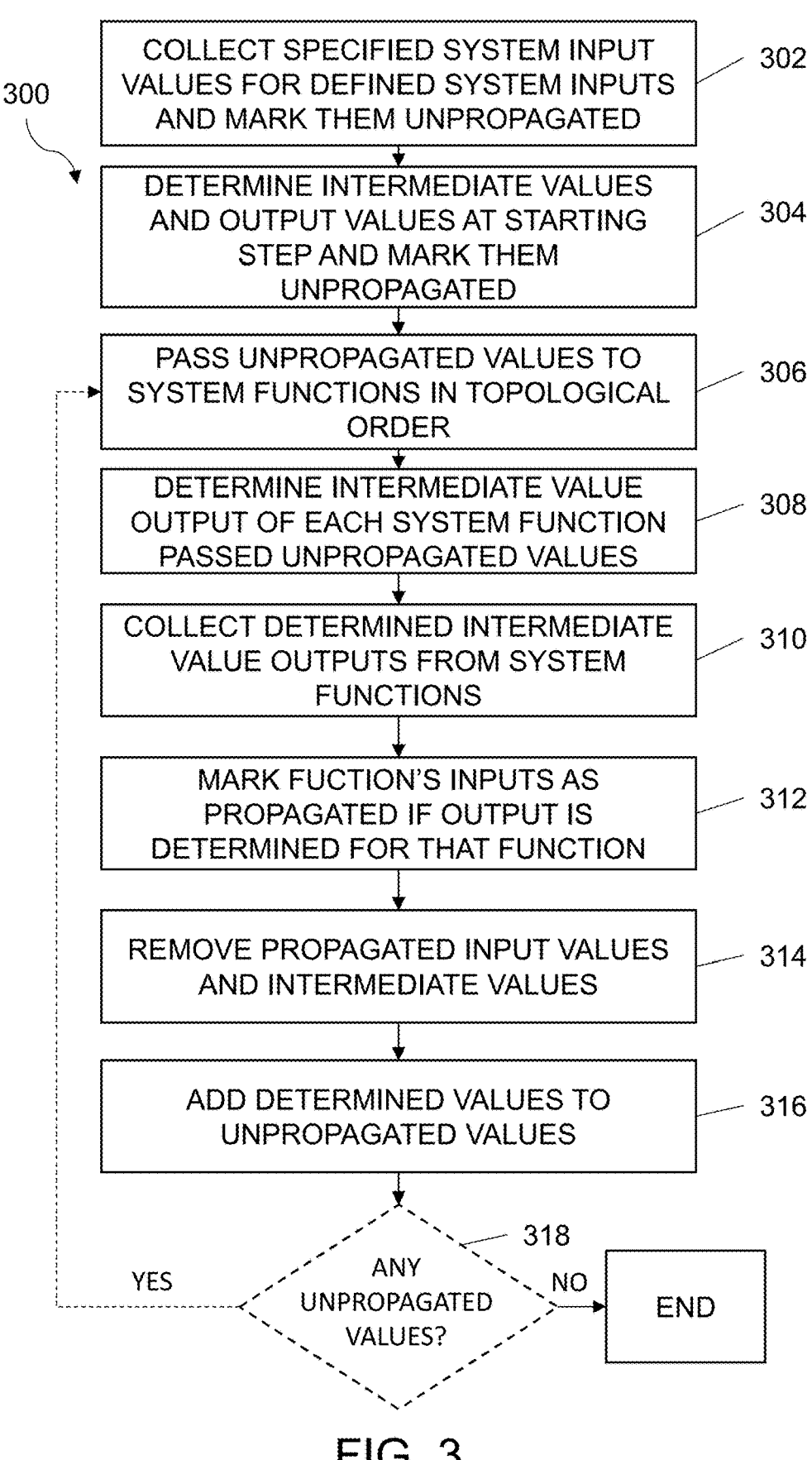
FIG. 3 is a flow diagram of an example method of determining a subset of system intermediate values and system output values from only defined system inputs.

FIG. 3 illustrates a flow diagram of an example method 300 of determining a system intermediate values and system output values that are unambiguously derivable from defined system inputs. The common features discussed above with respect to the example system in FIG. 1 can include similar characteristics to those discussed with respect to method 300 and vice versa. In some examples, the blocks of the method 300 are performed by system 100 described above.

The blocks of the flow diagram in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel in an event-driven manner).

The method 300 includes collecting specified system input values for defined system inputs and marking them as unpropagated (block 302). The specified system input values for the defined system inputs are collected from one or more test vectors for the system under test. At least one system input for the system under test is undefined for at least one test vector of the one or more test vectors.

The method 300 further includes determining intermediate values and output values at a starting step and marking them as unpropagated (block 304). In some examples, the intermediate values and output values determined at the starting step are intermediate values or output values determined at the starting step for functions that are configured to determine an output value despite the inputs not being defined. In some examples, there may not be any intermediate values or output values that can be determined at this step.

The method 300 further includes passing unpropagated values to system functions in topological order (block 306). In some examples, the unpropagated values are passed to system functions based on the topology information for the system under test. Generally, the first iteration of this step will include passing the unpropagated specified system inputs values to the first level of system functions. Subsequent iterations will involve passing determined intermediate values to functions that received outputs from the first level of system functions.

The method 300 further includes determining intermediate value outputs of each system function that is passed unpropagated values (block 308). In some examples, only intermediate outputs of a system function that can be unambiguously determined from the unpropagated values passed to that system function are determined. It should be noted that not all inputs to a particular system function need to be defined in order to determine an intermediate value. However, if insufficient inputs are provided to the system function to determine an intermediate value, then the output of the system function is indicated to be undefined.

The method 300 further includes collecting the determined system outputs from the system functions (block 310) and marking function inputs as propagated if an output is determined for that function (block 312). In some examples, the function inputs for a function are marked as propagated if it is determined that the output for that function is undefined due to insufficient information.

The method 300 further includes removing propagated input values and intermediate values (block 314) and adding determined values to unpropagated values (316). In some examples, the determined values include the intermediate values and the output values that are determined in block 308 and collected in block 310.

The method 300 optionally includes determining whether there are any unpropagated values (block 318). In examples where block 318 is not included, the method 300 ends. In examples where block 318 is included and no unpropagated values remain, the method 300 ends. In examples where block 318 is included and are unpropagated values, the method 300 proceeds to block 306 and repeats blocks 306-318. In some such examples, blocks 306-318 can be repeated until no unpropagated values remain. In other examples, the repeating of blocks 306-318 can be limited to a specific number of propagations in order to speed up execution. In examples where the repeating is not performed or is limited, there may be an impact on the results generated using method 300.

Figure 4A:
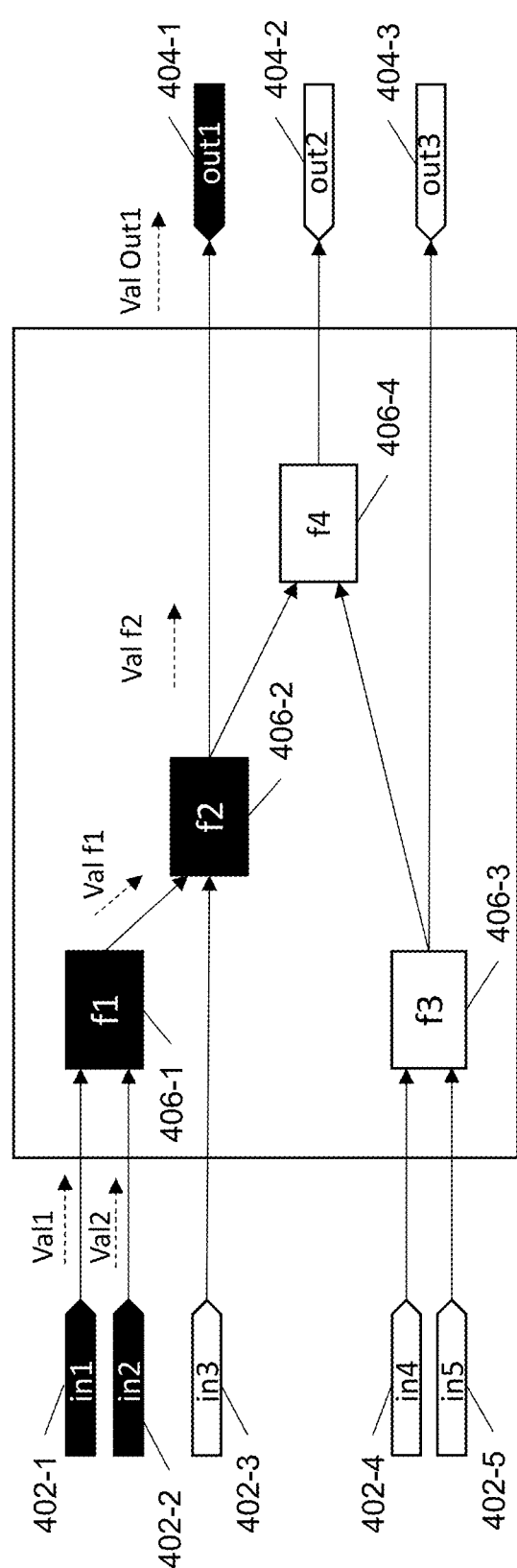
FIGS. 4A-4C are diagrams of example intermediate values and output values for an example system with partially defined system input values.
Figure 4B:
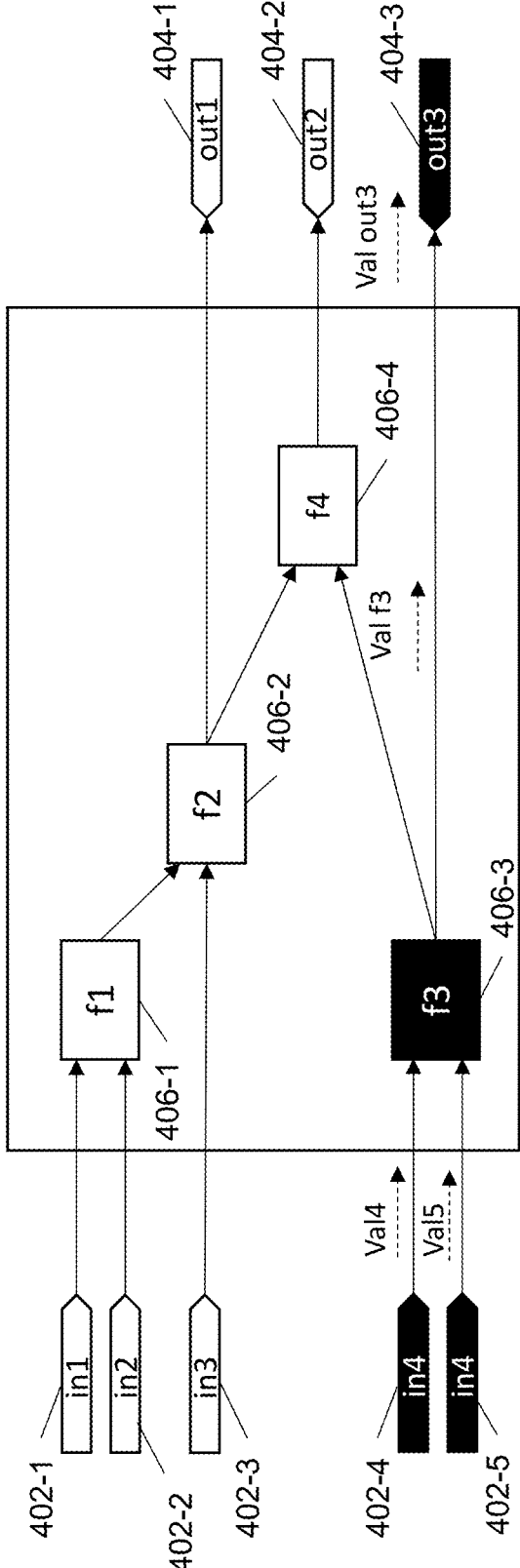
Figure 4C:
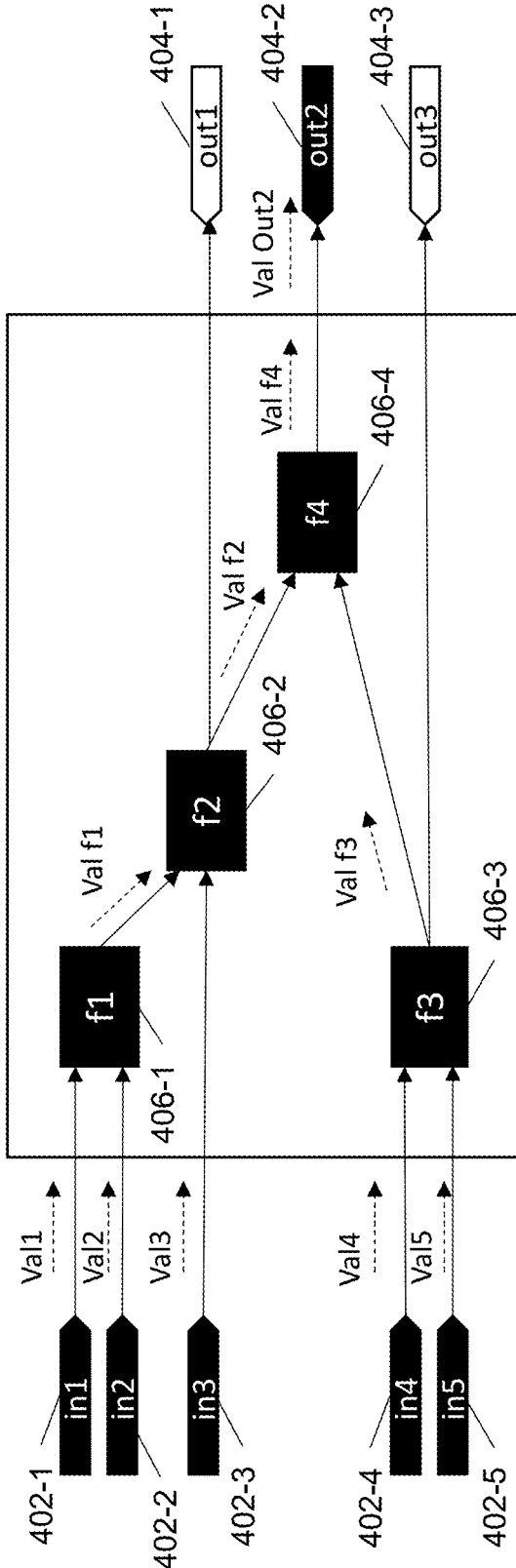

FIGS. 4A-4C are scenario diagrams of an example system 400. In the examples shown in FIGS. 4A-4C, the system 400 has five inputs 402 and three outputs 404. The system 400 also includes a first function 406-1 configured to receive the first input 402-1 and the second input 402-2, a second function 406-2 configured to receive the third input 402-3 and the output of the first function 406-1, a third function 406-3 configured to receive the fourth input 402-4 and the fifth input 402-5, and a fourth function 406-4 configured to receive the output of the second function 406-2 and the third function 406-3. The system 400 includes first output 404-1 configured to receive the output from the second function 406-2, a second output 404-2 configured to receive the output from the fourth function 406-4, and a third output 404-3 configured to receive the output from the third function 406-3.

FIG. 4A is a diagram 410 of a first test vector example where a requirement of the system 400 defines values for the first input 402-1 and the second input 402-2 and that the first output 404-1 depends on the first input 402-1 and the second input 402-2. The values of the third input 402-3, the fourth input 402-4, and the fifth input 402-5 are not defined in the test vector associated with FIG. 4A. In the example shown in FIG. 4A, the first function 406-1 is configured to determine a first intermediate value Val f1 based on the first input 402-1 and the second input 402-2. In the example shown in FIG. 4A, the second function 406-2 is configured to determine a second intermediate value Val f2 based on the first intermediate value Val f1. It should be noted that the third input 402-3 is not required for this scenario as the second function 406-2 can unambiguously determine the second intermediate value Val f2 based only on first intermediate value Val f1. The system 400 is configured to determine the first output value Val Out1 based on the second intermediate value Val f2.

In some examples, the user will see that the first output 404-1 is impacted by the values of the first input 402-1 and the second input 402-2. In some examples, the user will see that the second output 404-2 and the third output 404-3 are not impacted by the values of the first input 402-1 and the second input 402-2. Further, in some examples, the user will see that the third function 406-3 and the fourth function 406-4 are not covered by the test vector.

FIG. 4B is a diagram 420 of a second test vector example where a requirement of the system 400 defines values for the fourth input 402-4 and the fifth input 402-5 and that the third output 404-3 depends on the fourth input 402-4 and the fifth input 402-5. The first input 402-1, the second input 402-2, and the third input 402-3 are not defined in the test vector associated with FIG. 4B. In the example shown in FIG. 4B, the third function 406-3 is configured to determine a third intermediate value Val f3 based on the fourth input 402-4 and the fifth input 402-5. In the example shown in FIG. 4B, the system 400 is configured to determine the third output value Val Out3 based on the third intermediate value Val f3.

In some examples, the user will see that the third output 404-3 is impacted by the values of the fourth input 402-4 and the fifth input 402-5. In some examples, the user will see that the first output 404-1 and the second output 404-2 are not impacted by the values of the fourth input 402-4 and the fifth input 402-5. Further, in some examples, the user will see that the first function 406-1, the second function 406-2, and fourth function 406-4 are not covered by the second test vector.

FIG. 4C is a diagram 430 of a third test vector example where a requirement of the system 400 defines all of the inputs 402 and that the second output 404-2 depends on the first input 402-1, the second input 402-2, the third input 402-3, the fourth input 402-4, and the fifth input 402-5. In the example shown in FIG. 4C, the first function 406-1 is configured to determine a first intermediate value Val f1 based on the first input 402-1 and the second input 402-2. In the example shown in FIG. 4C, the second function 406-2 is configured to determine a second intermediate value Val f2 based on the third input 402-3 and the first intermediate value Val f1. In the example shown in FIG. 4C, the third function 406-3 is configured to determine a third intermediate value Val f3 based on the fourth input 402-4 and the fifth input 402-5. In the example shown in FIG. 4C, the fourth function 406-4 is configured to determine a fourth intermediate value Val f4 based on the second intermediate value Val f2 and the third intermediate value Val f3. The system 400 is configured to determine the second output value Val Out2 based on the fourth intermediate value Val f4.

In some examples, the user will see that the second output 404-2 is impacted by the values of the first input 402-1, the second input 402-2, the third input 402-3, the fourth input 402-4, and the fifth input 402-5. In some examples, the user will see that the first output 404-1 and the third output 404-3 are not impacted by the values of the first input 402-1, the second input 402-2, the third input 402-3, the fourth input 402-4, and the fifth input 402-5. In some examples, the user will see that the first function 406-1, the second function 406-2, the third function 406-3, and the fourth function 406-4 are all at least partially covered by the third test vector.

Figure 5A:
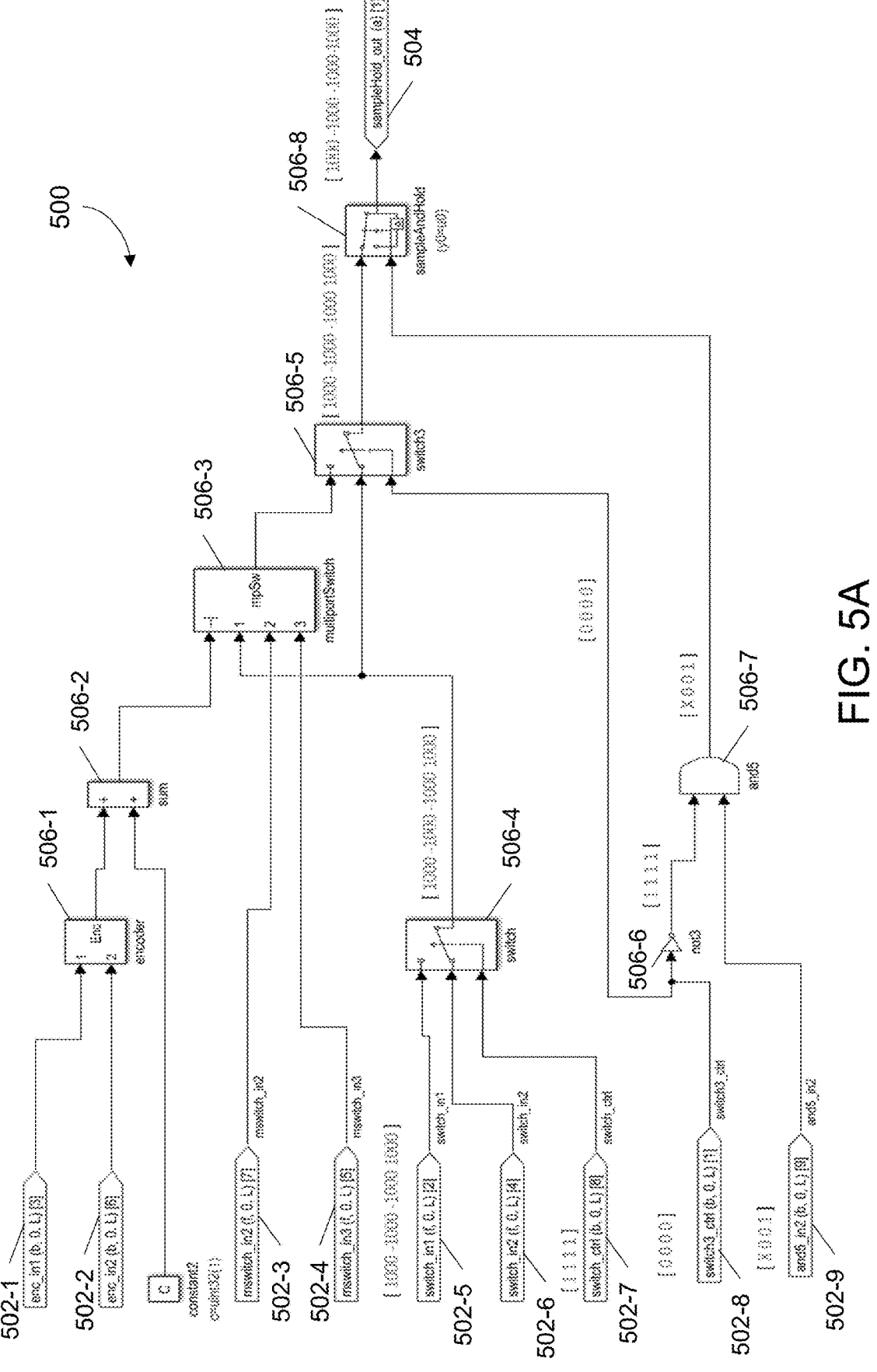
FIG. 5A is a diagram of an example system under test.

In some examples, test vectors can be used to determine the partial computation for a system with a combination of numerical and Boolean functions/operators. FIG. 5A is a diagram of an example system under test 500. In the example shown in FIG. 5A, the system under test 500 has nine inputs 502, one output 504, and eight functions 506. The first function 506-1 (encoder) is configured to receive the first input 502-1 (enc_in1) and the second input 502-2 (enc_in2). The second function 506-2 (sum) is configured to receive the output of the first function 506-1 and a constant value (constant2). The third function 506-3 (multiportS-witch) is configured to receive the output of the second function 506-2, the third input 502-3 (mswitch_in2), the fourth input 502-4 (mswitch_in3), and the output of the fourth function 506-4 (switch). The fourth function 506-4 (switch) is configured to receive the fifth input 502-5 (switch_in1), the sixth input 502-6 (switch_in2), and the seventh input 502-7 (switch_ctrl). The seventh input 502-7 is the control signal for the switch and determines which of the fifth input 502-5 and sixth input 502-6 is passed to the third function 506-3 and the fifth function 506-5 (switch3). The fifth function 506-5 is configured to receive the output of the third function 506-3, the output of the fourth function 506-4, and the eighth input 502-8 (switch3_ctrl). The eighth input 502-8 is the control signal for the switch and determines which of the inputs is passed to the eighth function 506-8 (sampleAndHold). The sixth function 506-6 (not3) is configured to receive the eighth input 502-8 and output the inverse of the value of the eighth input 502-8. The seventh function 506-7 (and5) is configured to receive the output of the sixth function 506-6 and the ninth input 502-9 (and5_in2). The seventh function 506-7 is configured to provide an output to the eighth function 506-8. The eighth function 506-8 is configured to receive the output of the fifth function 506-5 and the output of the seventh function 506-7. The output of the eighth function 506-8 is the output 504 of the system under test 500.

FIG. 5B is a diagram of a table 520 of the system input/output values for test vectors for the system under test 500 shown in FIG. 5A. In the example shown in FIGS. 5A-5B, there are four test vectors for the system under test 500. The table 520 includes respective rows for each of the test vectors for the system under test 500 shown in FIG. 5A. The table 520 includes a column for the number of execution steps and a column for each input 502 that includes a respective value for the input 502 for each respective test vector for the system under test 500. The table 520 also includes a column that includes a respective value for the output 504 for each respective test vector for the system under test 500. In the example shown in FIGS. 5A-5B, the requirement of the system under test 500 defined in the test vectors requires that the output 504 depends on the fifth input 502-5, the seventh input 502-7, the eighth input 502-8, and the ninth input 502-9. The first input 502-1, the second input 502-2, the third input 502-3, the fourth input 502-4, and the sixth input 502-6 are not defined in the test vectors shown in FIGS. 5A-5B.

The value of the seventh input 502-7 is 1 for all four test vectors, which results in the fourth function 506-4 being configured to output the value of the fifth input 502-5 for all of the test vectors. The value of the eighth input 502-8 is 0 for all four test vectors, which results in the fifth function 506-5 being configured to output the value received from the fourth function 506-4 and the sixth function 506-6 being configured to output the value 1 for all of the test vectors. By setting the values of the seventh input 502-7 and the eighth input 502-8 accordingly, it is guaranteed that the undefined inputs in the test vectors do not have an impact on the output 504.

The first test vector includes that the value of the fifth input 502-5 is 1000, the value of the ninth input 502-9 is undefined, and the value of the output 504 should be 1000. In the example shown in FIG. 5A, the fourth function 506-4 and the fifth function 506-5 are configured to output the value of the fifth input 502-5 (i.e. 1000) because the value of the seventh input 502-7 is 1. When the ninth input 502-9 is undefined, the output of the seventh function 506-7 is also undefined due to insufficient information. The output of the eighth function 506-8 and the output 504 of the system under test 500 is the value 1000 for the first test vector.

The second test vector includes the value of the fifth input 502-5 is −1000, the value of the ninth input 502-9 is 0, and the value of the output 504 should be −1000. In the example shown in FIG. 5A, the fourth function 506-4 and the fifth function 506-5 are configured to output the value of the fifth input 502-5 (i.e. −1000) because the value of the seventh input 502-7 is 1. When the ninth input 502-9 is 0, the output of the seventh function 506-7 is 0. The output of the eighth function 506-8 and the output 504 of the system under test 500 is the value −1000 for the second test vector.

The third test vector includes the value of the fifth input 502-5 is −1000, the value of the ninth input 502-9 is 0, and the value of the output 504 should be −1000. In the example shown in FIG. 5A, the fourth function 506-4 and the fifth function 506-5 are configured to output the value of the fifth input 502-5 (i.e. −1000) because the value of the seventh input 502-7 is 1. When the ninth input 502-9 is 0, the output of the seventh function 506-7 is 0. The output of the eighth function 506-8 and the output 504 of the system under test 500 is the value −1000 for the third test vector.

The fourth test vector includes the value of the fifth input 502-5 is 1000, the value of the ninth input 502-9 is 1, and the value of the output 504 should be −1000. In the example shown in FIG. 5A, the fourth function 506-4 and the fifth function 506-5 are configured to output the value of the fifth input 502-5 (i.e. 1000) because the value of the seventh input 502-7 is 1. When the ninth input 502-9 is 1, the output of the seventh function 506-7 is 1. The output of the eighth function 506-8 and the output 504 of the system under test 500 is the value −1000 for the fourth test vector.

FIG. 5C is a coverage report 530 for the system under test 500 shown in FIG. 5A and the system input/output values from the table 520 shown in FIG. 5B. The coverage report 530 includes respective rows for each of the functions 506 of the system under test 500 shown in FIG. 5A. In the example shown in FIG. 5C, the coverage report 530 also includes respective columns for different types of coverage, which includes the percentage of requirements achieved from the specific input values of the test vectors. In the example shown in FIG. 5C, functionality of the sixth function 506-6, the seventh function 506-7, and eighth function 506-8 has been demonstrated with the test vectors.

In some examples, the user will see that the output 504 depends from the fifth input 502-5, the seventh input 502-7, and the eighth input 502-8 based on the first test vector. In some examples, the user will see that the output 504 depends from the fifth input 502-5, the seventh input 502-7, the eighth input 502-8, and the ninth input 502-9 based on the second, third, and fourth test vectors.

Figure 6A:
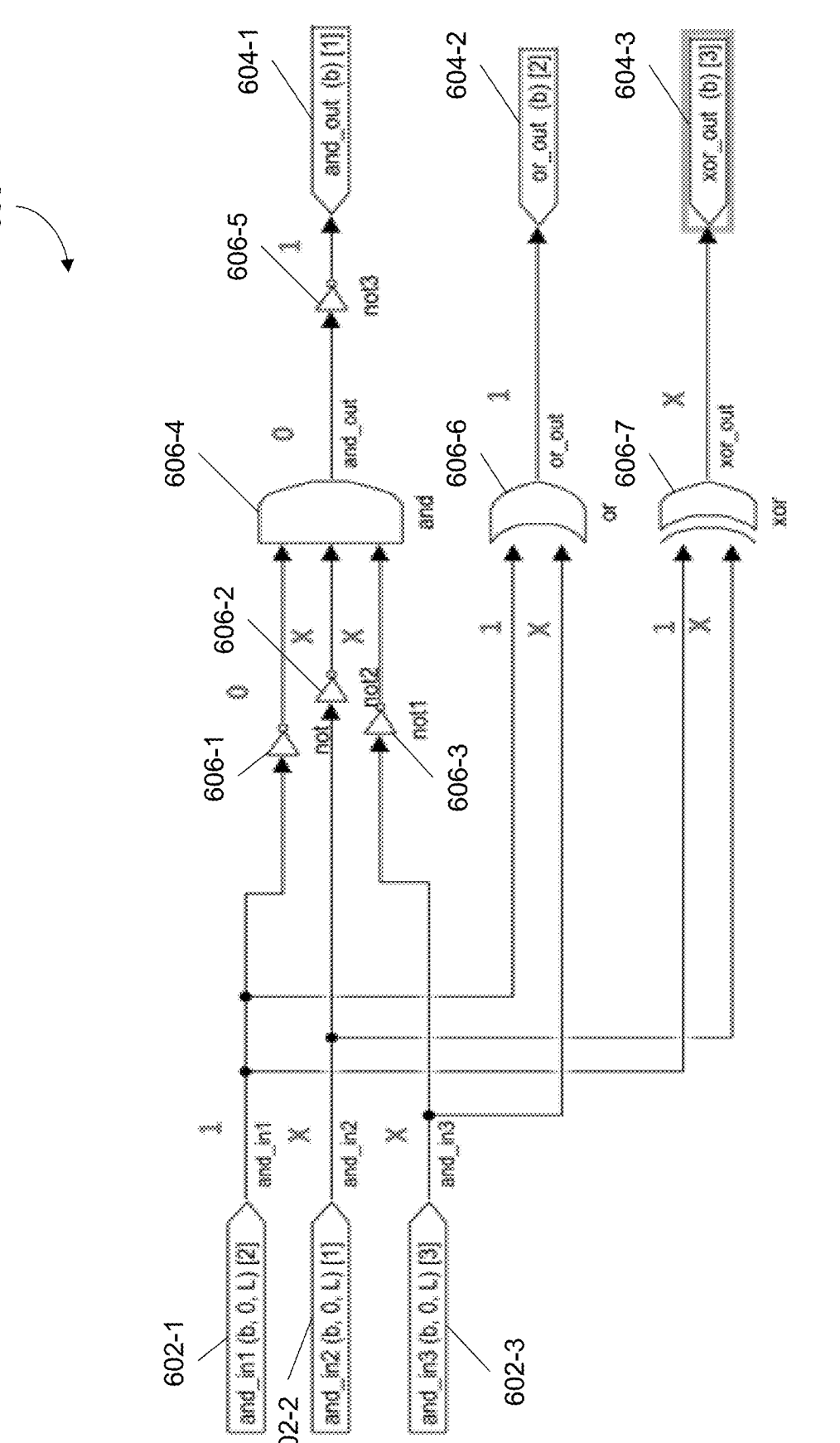
FIG. 6A is a diagram of an example system under test.

In some examples, test vectors can be used to determine the partial computations for a system with a combination of different types of Boolean functions/operators. FIG. 6A is a diagram of another example system under test 600. In the example shown in FIG. 6A, the system under test 600 has three inputs 602, three outputs 604, and seven functions 606. The first function 606-1 (not) is configured to receive the first input 602-1 (and_in1) and output the inverse of the value of the first input 602-1. The second function 606-2 (not2) is configured to receive the second input 602-2 (and_in2) and output the inverse of the value of the second input 602-2. The third function 606-3 (not1) is configured to receive the third input 602-3 (and_in3) and output the inverse of the value of the third input 602-3. The fourth function 606-4 (and) is configured to receive the output of the first function 606-1, the output of the second function 606-2, and the output of the third function 606-3. The fourth function 606-4 is configured to output a value of 1 if the values from the first function 606-1, the second function 606-2, and the third function 606-3 are all 1. Otherwise, the fourth function 606-4 is configured to output a value of 0. The fifth function 606-5 (not3) is configured to receive the output of the fourth function 606-4 and output the inverse of the value of the output from the fourth function 606-4. The sixth function 606-6 (or) is configured to receive the first input 602-1 and the third input 602-3. The sixth function 606-6 is configured to output a value of 1 if the first input 602-1 or the third input 602-3 is a value of 1 and to output a value of 0 if both the first input 602-1 and the third input 602-3 have a value of 0. The output of the sixth function 606-6 is the second output 604-2 of the system under test 600. The seventh function 606-7 (xor) is configured to receive the first input 602-1 and the second input 602-2. The seventh function 606-7 is configured to output a value of 1 if either, but not both, the first input 602-1 or the second input 602-2 has a value of 1 and to output a value of 0 if both the first input 602-1 and the second input 602-2 have a value of 0 or 1. The output of the seventh function 606-7 is the third output 604-3 of the system under test 600.

FIG. 6B is a diagram of a table 620 of system input/output values for a test vector for the system under test 600 shown in FIG. 6A. In the examples shown in FIGS. 6A-6B, there is a single test vector for the system under test 600. The table 620 includes a column for the number of execution steps and a column for each input 602 that includes a respective value for the input 602 for the test vector for the system under test 600. The table 620 also includes a column that includes a respective value for the output 604 for the test vector for the system under test 600.

The test vector includes one execution step, the value of the first input 602-1 is 1, the value of the second input 602-2 is undefined, and the value of the third input 602-3 is undefined. The test vector also defines that the value of the first output 604-1 should be 1, the value of the second output 604-2 should be 1, and the value of the third output 604-3 should be undefined. The first function 606-1 is configured to output a value of 0, and the outputs of the second function 606-2 and the third function 606-3 are undefined. The fourth function 606-4 is configured to output a value of 0 since the values received from the first function 606-1, the second function 606-2, and the third function 606-3 are not all equal to 1. The fifth function 606-5 and the first output 604-1 of the system under test 600 is a value of 1 for the first test vector. The sixth function 606-6 and the second output 604-2 of the system under test 600 is a value of 1 for the first test vector. The output of the seventh function 606-7 and the third output 604-3 is undefined for the first test vector since it cannot be determined since values for both the first input 602-1 and the second input 602-2 are needed for the determination.

FIG. 6C is a coverage report 630 for the system under test 600 shown in FIG. 6A and the system input/output values from the table 620 shown in FIG. 6B. The coverage report 630 includes respective rows for each of the functions 606 of the system under test 600 shown in FIG. 6A. In the example shown in FIG. 6C, the coverage report 630 also includes respective columns for different types of coverage. In the example shown in FIG. 6C, only functionality of the fifth function 606-5 has been demonstrated with the test vector. The user will see that the first output 604-1 and the second output 604-2 depend on the first input 602-1 based on the test vector.

Figure 7A:
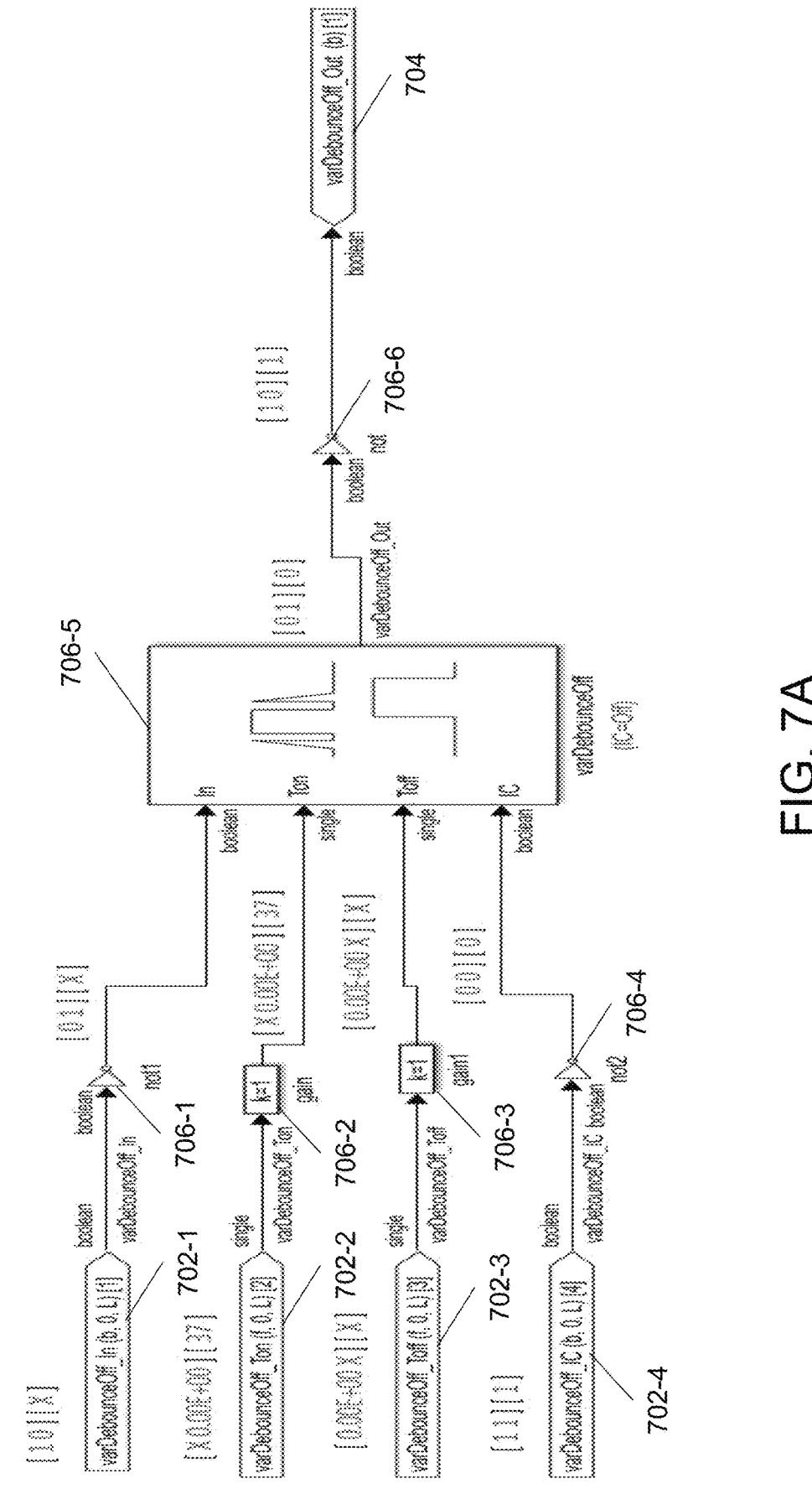
FIG. 7A is a diagram of an example system under test.

In some examples, test vectors can be used to determine the output computations for a system with a combination of different types of time dependent and Boolean functions/operators. FIG. 7A is a diagram of another example system under test 700. In the example shown in FIG. 7A, the system under test 700 has four inputs 702 and one output 704, and six functions. The first function 706-1 (not1) is configured to receive the first input 702-1 (varDebounceOff_In) and output the inverse of the value of the first input 702-1. The second function 706-2 (gain) is configured to receive and multiply the value of the second input 702-2 (varDebounceOff_Ton) by 1. The third function 706-3 (gain1) is configured to receive and multiply the value of the third input 702-3 (varDebounceOff_Toff) by 1. The fourth function 706-4 (not2) is configured to receive the fourth input 702-4 (varDebounceOff_IC) and output the inverse of the value of the fourth input 702-4. The fifth function 706-5 (varDebounceOff) is configured to receive the output of the first function 706-1, the output of the second function 706-2, the output of the third function 706-3, and the output of the fourth function 706-4. At system startup, the fifth function 706-5 can determine an output despite values of either the second input 702-2 or the third input 702-3 being undefined. If the initial output of the fifth function 706-5 is zero, then only the second input 702-2 is required. Otherwise, the third input 702-3 is needed in order to determine the output of the fifth function 706-5. Similarly, when the third input 702-3 is zero and the first input 702-1 is zero, then the fifth function 706-5 is configured to output a value of zero irrespective of other inputs. The sixth function 706-6 (not) is configured to receive the output of the fifth function 706-5 and output the inverse of the value of the output of the fifth function 706-5.

FIG. 7B is a diagram of a table 720 of system input/output values for test vectors for the system under test 700 shown in FIG. 7A. In the examples shown in FIGS. 7A-7B, there are three test vectors for the system under test 700. The table 720 includes respective rows for each of the test vectors for the system under test 700 shown in FIG. 7A. The table 720 includes a column for the number of execution steps and a column for each input 702 that includes a respective value for the input 702 for each respective test vector for the system under test 700. The table 720 also includes a column that includes a respective value for the output 704 for each respective test vector for the system under test 700.

The first test vector includes one execution step, the value of the first input 702-1 is 1, the value of the second input 702-2 is undefined, the value of the third input 702-3 is 0, the value of the fourth input 702-4 is 1, and the value of the output 704 should be 1. The first function 706-1, the third function 706-3, and the fourth function 706-4 are each configured to output a value of 0 and the output of the second function 706-2 is undefined. The fifth function 706-5 is configured to output a value of 0, and the sixth function 706-6 and the system under test 700 are configured to output a value of 1 for the first test vector.

The second test vector includes one execution step, the value of the first input 702-1 is 0, the value of the second input 702-2 is 0, the value of the third input 702-3 is undefined, the value of the fourth input 702-4 is 1, and the value of the output 704 should be 0. The first function 706-1 is configured to output a value of 1. The second function 706-2 and the fourth function 706-4 are configured to output a value of 0, and the output of the third function 706-3 is undefined. The fifth function 706-5 is configured to output a value of 1, and the sixth function 706-6 and the system under test 700 are configured to output a value of 0 for the second test vector.

For the third test vector, the system under test 700 is initialized. The third test vector includes one execution step, the value of the first input 702-1 is undefined, the value of the second input 702-2 is 37, the value of the third input 702-3 is undefined, the value of the fourth input 702-4 is 1, and the value of the output 704 should be 1. The output of the first function 706-1 and the output of the third function 706-3 are undefined. The second function 706-2 is configured to output a value of 37 and the fourth function 706-4 is configured to output a value of 0. The fifth function 706-5 is configured to output a value of 0, and the sixth function 706-6 and the system under test 700 are configured to output a value of 1 for the third test vector.

FIG. 7C is a coverage report 730 for the system under test 700 shown in FIG. 7A and the system input/output values from the table 720 shown in FIG. 7B. The coverage report 730 includes respective rows for each of the functions 706 of the system under test 700 shown in FIG. 7A. In the example shown in FIG. 7C, the coverage report 730 also includes respective columns for different types of coverage. In the example shown in FIG. 7C, one type of coverage is not evaluated for the functions and only functionality of the sixth function 706-6, the first function 706-1, and the fifth function 706-5 have been demonstrated with the test vectors.

In some examples, the user will see that the output 704 depends from the first input 702-1, the third input 702-3, and the fourth input 702-4 based on the first test vector. In some examples, the user will see that the output 704 depends from the first input 702-1, the second input 702-2, and the fourth input 702-4 based on the second test vector. In some examples, the user will see that the output 704 depends from the second input 702-2 and the fourth input 702-4 based on the third test vector.

Figure 8A:
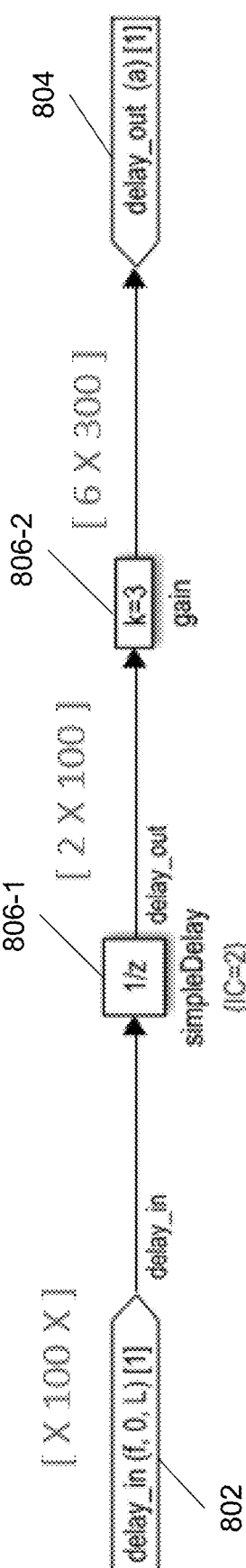
FIG. 8A is a diagram of an example system under test.

In some examples, test vectors can be used to determine the output computation for a system at startup. FIG. 8A is a diagram of an example system under test 800. In the example shown in FIG. 8A, the system under test 800 has one input 802 (delay_in) and one output 804 (delay_out). The system under test 800 also includes a first function 806-1 (simpleDelay) configured to receive the input 802 and a second function 806-2 (gain) configured to receive the output of the first function 806-1. The first function 806-1 is configured to output the value input 802 to the first function 806-1 after a delay of one sample period. The second function 806-2 is configured to multiply the value output by the first function 806-1 by 3. The output of the second function 806-2 is then the output 804 of the system under test 800.

FIG. 8B is a diagram of a table 820 of the system input/output values for test vectors for the system under test 800 shown in FIG. 8A. In the examples shown in FIGS. 8A-8B, there are three test vectors for the system under test 800. The table 820 includes respective rows for each of the test vectors for the system under test 800 shown in FIG. 8A. The table 820 includes a column for the number of execution steps and a column for each input 802 that includes a respective value for the input 802 for each respective test vector for the system under test 800. The table 820 also includes a column that includes a respective value for the output 804 for each respective test vector for the system under test 800. In the example shown in FIGS. 8A-8B, the requirement of the system under test 800 defined in the test vectors requires that the output 804 depends on the input 802, but the input 802 does not necessarily need to be defined in order for the output 804 to be unambiguously determined.

The first test vector includes that the value of the input 802 is undefined (shown as an X in the table 820) and the value of the output 804 should be 6. At startup, the first function 806-1 is configured to compute an output of 2 without regards of input 802 at the starting step and the second function 806-2 is configured to multiply the output from the first function 806-1 by 3. The output of the second function 806-2 and the output 804 of the system under test 800 is the value 6 for the first test vector.

The second test vector includes that the value of the input 802 is 100, and the value of the output 804 is undefined (shown as an X in the table 820). The first function 806-1 is configured to output the value that was input to the first function 806-1 in the previous sample period, which was undefined. In other words, the output of the first function 806-1 is undefined for the second test vector. Since the second function 806-2 is configured to multiply the output from the first function 806-1 by 3, the output of the second function 806-2 and the output 804 of the system under test 800 is also undefined for the second test vector.

The third test vector includes that the value of the input 802 is undefined (shown as an X in the table 820) and the value of the output 804 is 300. The first function 806-1 is configured to output the value that was input to the first function 806-1 in the previous sample period, which was 100. The second function 806-2 is configured to multiply the output from the first function 806-1 by 3, so the output of the second function 806-2 and the output 804 of the system under test 800 is the value 300 for the third test vector.

FIG. 8C is a coverage report 830 for the system under test 800 shown in FIG. 8A and the system input/output values from the table 820 shown in FIG. 8B. The coverage report 830 includes respective rows for each of the functions 806 of the system under test 800 shown in FIG. 8A. In the example shown in FIG. 8C, the first row is associated with the second function 806-2 and the second row is associated with the first function 806-1. In the example shown in FIG. 8C, the coverage report 830 also includes respective columns for different types of coverage. In the example shown in FIG. 8C, the coverage for both the first function 806-1 and the second function 806-2 is 100% for both types of coverage.

Figure 9A:
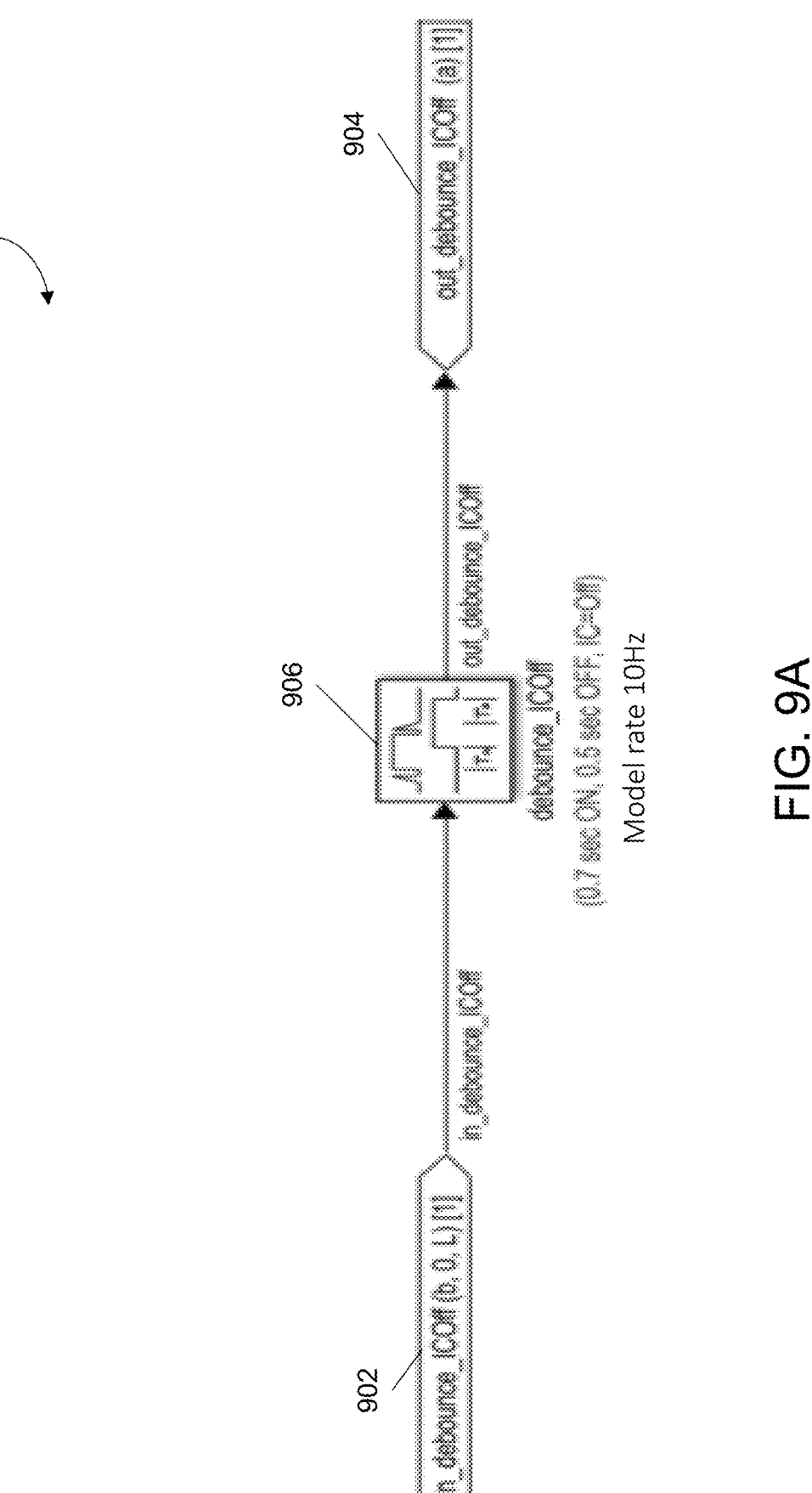
FIG. 9A is a diagram of an example system under test.

In some examples, test vectors can be used to determine partial computation at different execution steps when no input value is defined. FIG. 9A is a diagram of another example system under test 900. In the example shown in FIG. 9A, the system under test 900 has one input 902 (in_debounce_ICOff) and one output 904 (out_debounce_I-COff). The system under test 900 also includes a function 906 (debounce_ICOff). In the example shown in FIG. 9A, the function 906 has an ON time set as 0.7 seconds, and an OFF time set as 0.5 seconds. In some examples, the function 906 has a model rate of 10 Hz. The function 906 is configured to receive the input 902, output a value of 1 when ON time is met, and output a value of 0 when OFF time is met, otherwise the previous output is retained.

FIG. 9B is a diagram of a table 920 of the system input/output values for test vectors for the system under test

900 shown in FIG. 9A. In the examples shown in FIGS. 9A-9B, there are seven test vectors for the system under test 900. The table 920 includes respective rows for each of the test vectors for the system under test 900 shown in FIG. 9A. The table 920 includes a column for the number of execution steps and a column for each input 902 that includes a respective value for the input 902 for each respective test vector for the system under test 900. The table 920 also includes a column that includes a respective value for the output 904 for each respective test vector for the system under test 900. In the example shown in FIGS. 9A-9B, the requirement of the system under test 900 defined in the test vectors requires that the output 904 depends on the input 902, but the input 902 does not necessarily need to be defined in order for the output 904 to be unambiguously determined.

The first test vector includes one execution step, the value of the input 902 is undefined (shown as an X in the table 920), and the value of the output 904 should be 0. At startup, when the input 902 is undefined, the function 906 is configured to compute an output of 0, which was the initial condition at startup. The output of the function 906 and the system under test 900 is a value of 0 for the first test vector.

The second test vector includes seven execution steps, the value of the input 902 is 1, and the value of the output 904 should be undefined (shown as an X in the table 920). Neither the ON time nor the OFF time is met, and the output of the function 906 and the output 904 of the system under test 900 is undefined after seven execution steps for the second test vector.

The third test vector includes one execution step, the value of the input 902 is 1, and the value of the output 904 should be 1. The function 906 is configured to determine that the ON time is met since there is a single execution step and the value of the input 902 is 1. The output of the function 906 and the output 904 of the system under test 900 is the value 1 for the third test vector.

The fourth test vector includes one execution step, the value of the input 902 is undefined (shown as an X in the table 920), and the value of the output 904 should be 1. Even though the input 902 is undefined, the function 906 can unambiguously determine that neither the ON time nor the OFF time is met, and therefore the output of the function 906 is the same as the previous output. The output of the function 906 and the output 904 of the system under test 900 is the value 1 for the fourth test vector.

The fifth test vector includes one execution step, the value of the input 902 is undefined (shown as an X in the table 920), and the value of the output 904 should be 1. Even though the input 902 is undefined, the function 906 can unambiguously determine that neither the ON time nor the OFF time is met, and therefore the output of the function 906 is the same as the previous output. The output of the function 906 and the output 904 of the system under test 900 is the value 1 for the fifth test vector.

The sixth test vector includes five execution steps, the value of the input 902 is 0, and the value of the output 904 should be undefined (shown as an X in the table 920). Neither the ON time nor the OFF time is met, and the output of the function 906 and the output 904 of the system under test 900 is undefined after five execution steps for the second test vector.

The seventh test vector includes one execution step, the value of the input 902 is 0, and the value of the output 904 should be 0. The function 906 is configured to determine that the OFF time is met since there is a single execution step and the value of the input 902 is 0. The output of the function 906 and the output 904 of the system under test 900 is the value 0 for the seventh test vector.

FIG. 9C is a coverage report 930 for the system under test 900 shown in FIG. 9A and the system input/output values from the table 920 shown in FIG. 9B. The coverage report 930 includes a single row since there is only one function 906 of the system under test 900 shown in FIG. 9A. In the example shown in FIG. 9C, the coverage report 930 also includes respective columns for different types of coverage. In the example shown in FIG. 9C, the coverage for the function 906 is 0% for both types of coverage.

FIG. 10 illustrates example code for a function of an example system under test. In the example shown in FIG. 10, the code shown in FIG. 10 is compatible with C and Java languages and represents one possible implementation of the fifth function 706-5 (varDebounceOff function) shown in FIG. 7A and described above. It should be understood that the techniques described herein are not limited to a particular programming language and a different programming language could be used depending on the implementation.

Similar to the discussion above, the code can be evaluated based on partially defined inputs and intermediate values and system output values will be generated. For the example shown in FIG. 10, a determination of the partial propagation conditions at a function interface level can be made based on prior examination of the code for the function, and a partial constraint propagation can be subsequently performed without examination the function code every time.

In other examples, if the function is implemented using code similar to a STATEFLOW chart (has internal states), for example, then this can allow for intermediate value and output value calculation with partially defined inputs as well as verifying system behavior and responses.

It should be understood that the techniques described herein are not limited to the particular examples described above and can be used to evaluate a different system under test using the same principles. The techniques described herein are not limited to a particular number of inputs, outputs, or functions nor are they limited to particular topologies or functionality.

By using the techniques described herein, the systems and methods provide much higher quality of testing and coverage analysis by verifying correctness of system behaviors without requiring all system inputs to be defined. Further, the systems and methods can demonstrate that the behaviors are present in the system under test without making any assumptions about undefined inputs. The techniques described herein enable coverage determinations to be made for specific functions/operators where input/output values are determined without providing any unintended coverage information. This simplifies test vector creation and provides more accurate and rigorous verification without making assumptions, which can significantly reduce the time required for validation and coverage analysis for a system under test.

In various aspects, system elements or examples described throughout this disclosure (such as the system or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EE-PROM), and flash memory, etc. Suitable processor-readable media may also include transmission media such as electrical, electromagnetic, or digital signals, conveyed via a communication medium such as a network and/or a wireless link.

The techniques described here may be implemented in digital electronic circuitry, or with a programmable processor (for example, a special-purpose processor or a general-purpose processor such as a computer), firmware, software, or in combinations of them. On a programmable processor, the techniques described herein can be implemented as a model within software tools such as, for example, MATLAB Simulink, SCADE, etc. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a method, comprising: receiving one or more test scenarios based on requirements for a system under test having one or more inputs, wherein a value for at least one input of the one or more inputs is undefined for at least one test scenario of the one or more test scenarios; determining system intermediate values and system output values that are unambiguously derivable from defined system inputs for the one or more test scenarios, wherein the defined system inputs are defined in the one or more test scenarios and not assumed or default input values; determining coverage of one or more functional characteristics of each function of the system under test executed based on the defined system inputs; and validating the determined system output values that are unambiguously derivable from the defined system inputs.

Example 2 includes the method of Example 1, wherein the one or more test scenarios include multiple test scenarios, wherein determining system intermediate values and system output values that are unambiguously derivable from defined system inputs for the one or more test scenarios is further dependent upon a history of values of the defined system inputs over time for the multiple test scenarios.

Example 3 includes the method of Example 2, wherein the defined system inputs changes over time for the multiple test scenarios.

Example 4 includes the method of any of Examples 1-3, further comprising determining overall coverage of the system under test by combining coverage results from a plurality of test scenarios.

Example 5 includes the method of any of Examples 1-4, wherein determining system intermediate values and system output values that are unambiguously derivable from defined system inputs for the one or more test scenarios includes: collecting all specified system input values for the defined system inputs; marking the specified system input values as unpropagated; passing unpropagated system input values to functions of the system under test in topological order; determining respective system intermediate values of each respective function of the system under test generated using respective specified values of subset of inputs propagated to the respective function in each step of execution; marking inputs of a respective function as propagated if a respective intermediate value is determined for the respective function; removing propagated system input values and propagated intermediate values from further analysis; and marking the determined intermediate values of functions as unpropagated for inputs to other functions in topological order.

Example 6 includes the method of any of Examples 1-5, further comprising outputting the determined coverage of one or more functional characteristics of each function of the system under test executed based on the defined system inputs and results of the validation in a report.

Example 7 includes the method of any of Examples 1-6, further comprising: marking system inputs that are not the defined system inputs as undefined; and marking system outputs that are not determined from only the defined system inputs as undefined.

Example 8 includes a system, comprising: an input configured to receive information about a system under test, wherein the system under test includes: one or more inputs, wherein a value for at least one input of the one or more inputs is undefined for at least one test vector of one or more test vectors based on requirements for the system under test; one or more functions, wherein each function of the one or more functions is configured to a generate respective intermediate value based, at least in part, on a value of at least one of the one or more inputs; and one or more outputs, wherein each output of the one or more outputs is configured to provide an output value based, at least in part, on at least one of the respective intermediate values; one or more computational elements communicatively coupled to a memory, wherein the one or more computational elements are configured to: determine intermediate values and output values that are unambiguously derivable from defined system inputs for the one or more test vectors, wherein the defined system inputs are defined in the one or more test vectors and not assumed or default input values; determine coverage of one or more functional characteristics of each of the one or more functions dependent on only the defined system inputs; and validate the system output values determined from only the defined system inputs.

Example 9 includes the system of Example 8, wherein the one or more inputs include a first input and a second input, wherein a value of the first input is defined in a first test vector and a value of the second input is undefined in the first test vector; wherein the one or more computational elements are configured to: determine intermediate values and output values that are unambiguously derivable from the value of the first input for the first test vector; determine coverage of one or more functional characteristics of each of the one or more functions dependent on only the value of the first input for the first test vector; and validate the system output values determined from only the value of the first input for the first test vector.

Example 10 includes the system of Example 9, wherein a value of the first input is defined in a second test vector and a value of the second input is defined in the second test vector; wherein the one or more computational elements are configured to: determine intermediate values and output values that are unambiguously derivable from the value of the first input and the value of the second input for the second test vector; determine coverage of one or more functional characteristics of each of the one or more functions dependent on only the value of the first input and the value of the second input for the second test vector; and validate the system output values determined from only the value of the first input for the second test vector and the value of the second input for the second test vector.

Example 11 includes the system of any of Examples 8-10, wherein the one or more computational elements are configured to mark inputs that are not defined in the one or more test vectors as undefined; and wherein the inputs marked as undefined are not used by the one or more computational elements to determine intermediate values and output values that are unambiguously derivable from defined system inputs for the one or more test vectors.

Example 12 includes the system of Example 11, wherein one or more computational elements are configured to mark outputs that are not unambiguously derivable from the defined system inputs for the one or more test vectors as undefined.

Example 13 includes the system of any of Examples 8-12, wherein the one or more test vectors include multiple test vectors, wherein the one or more computational elements are configured to determine intermediate values and output values that are unambiguously derivable from defined system inputs for the one or more test vectors based upon a history of values of the defined system inputs over time for the multiple test vectors.

Example 14 includes the system of any of Examples 8-13, wherein the one or more computational elements are further configured to output the determined coverage of one or more functional characteristics of each of the one or more functions dependent on only the defined system inputs and results of the validation in a report.

Example 15 includes the system of any of Examples 8-14, wherein the one or more computational elements are configured to determine system intermediate values and system output values that are unambiguously derivable from defined system inputs for the one or more test vectors by: collecting all specified system input values for the defined system inputs; marking the specified system input values as unpropagated; passing unpropagated system input values to functions of the system under test in topological order; determining respective system intermediate values of each respective function of the system under test generated using respective specified values of subset of inputs propagated to the respective function in each step of execution; marking inputs of a respective function as propagated if a respective intermediate value is determined for the respective function; removing propagated system input values and propagated intermediate values from further analysis; and marking the determined intermediate values of functions as unpropagated for inputs to other functions in topological order.

Example 16 includes a system, comprising: one or more processors; and a non-transitory, computer readable medium communicatively coupled to the one or more processors, wherein the non-transitory, computer readable medium stores instructions which, when executed by the one or more processors, cause the one or more processors to: receive one or more test vectors based on requirements for a system under test, wherein the system under test includes one or more inputs, one or more functions configured to a generate respective intermediate value based on a value of at least one of the one or more inputs, and one or more outputs configured to provide an output value based on at least one of the respective intermediate values; determine system intermediate values and system output values that are unambiguously derivable from input values defined in the one or more test vectors, wherein the input values defined in the one or more test vectors are not assumed or default input values, wherein an input value for at least one input of the one or more inputs is undefined for at least one test vector of the one or more test vectors; determine coverage of one or more functional characteristics of each function of the system under test executed based on the input values defined in the one or more test vectors; and validate the determined system output values that are unambiguously derivable from the input values defined in the one or more test vectors.

Example 17 includes the system of Example 16, wherein the one or more test vectors include multiple test vectors, wherein the non-transitory, computer readable medium stores instructions which, when executed by the one or more processors, cause the one or more processors to determine system intermediate values and system output values that are unambiguously derivable from input values defined in the one or more test vectors based on a history of values of the defined system inputs over time for the multiple test vectors.

Example 18 includes the system of any of Examples 16-17, wherein the non-transitory, computer readable medium further stores instructions which, when executed by the one or more processors, further cause the one or more processors to: mark system inputs that are not the defined system inputs as undefined; and mark system outputs that are not determined from only the defined system inputs as undefined.

Example 19 includes the system of any of Examples 16-18, wherein the non-transitory, computer readable medium further stores instructions which, when executed by the one or more processors, further cause the one or more processors to determine overall coverage of the system under test by combining coverage results from a plurality of test vectors.

Example 20 includes the system of any of Examples 18-19, wherein the non-transitory, computer readable medium further stores instructions which, when executed by the one or more processors, cause the one or more processors to determine system intermediate values and system output values that are unambiguously derivable from input values defined in the one or more test vectors by propagating only the input values defined in the one or more test vectors and not undefined inputs.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method, comprising:

receiving one or more test vectors based on requirements for a system under test having one or more inputs, wherein a value for at least one input of the one or more inputs is undefined for at least one test vector of the one or more test vectors;

determining system intermediate values and system output values that are derived only from defined system inputs for the one or more test vectors, wherein the defined system inputs are explicitly defined in the one or more test vectors without consideration of assumed or default input values;

determining coverage of one or more functional characteristics of each function of the system under test executed based on the defined system inputs; and validating the determined system output values that are derived only from the defined system inputs.

2. The method of claim 1, wherein the one or more test vectors include multiple test vectors, wherein determining system intermediate values and system output values that are derived only from defined system inputs for the one or more test vectors is further dependent upon a history of values of the defined system inputs over time for the multiple test vectors.

3. The method of claim 2, wherein the defined system inputs changes over time for the multiple test vectors.

4. The method of claim 1, further comprising determining overall coverage of the system under test by combining coverage results from a plurality of test vectors.

5. The method of claim 1, wherein determining system intermediate values and system output values that are derived only from defined system inputs for the one or more test vectors includes:

collecting all specified system input values for the defined system inputs;

marking the specified system input values as unpropagated;

passing unpropagated system input values to functions of the system under test in topological order;

determining respective system intermediate values of each respective function of the system under test generated using respective specified values of subset of inputs propagated to the respective function in each step of execution;

marking inputs of a respective function as propagated if a respective intermediate value is determined for the respective function;

removing propagated system input values and propagated intermediate values from further analysis; and marking the determined intermediate values of functions as unpropagated for inputs to other functions in topological order.

6. The method of claim 1, further comprising outputting the determined coverage of one or more functional characteristics of each function of the system under test executed based on the defined system inputs and results of the validation in a report.

7. The method of claim 1, further comprising:

marking system inputs that are other than the defined system inputs as undefined; and marking system outputs as defined only if the system outputs are determined from the defined system inputs or if the system under test provides the system outputs without consideration of system inputs.

8. A system, comprising:

an input configured to receive information about a system under test, wherein the system under test includes:

one or more inputs, wherein a value for at least one input of the one or more inputs is undefined for at least one test vector of one or more test vectors based on requirements for the system under test;

one or more functions, wherein each function of the one or more functions is configured to generate respective intermediate value based, at least in part, on a value of at least one of the one or more inputs; and one or more outputs, wherein each output of the one or more outputs is configured to provide an output value based, at least in part, on at least one of the respective intermediate values; and one or more computational elements communicatively coupled to a memory, wherein the one or more computational elements are configured to:

determine intermediate values and output values that are derived only from defined system inputs for the one or more test vectors, wherein the defined system inputs are explicitly defined in the one or more test vectors without consideration of assumed or default input values;

determine coverage of one or more functional characteristics of each of the one or more functions dependent on only the defined system inputs; and validate the system output values determined from only the defined system inputs.

9. The system of claim 8, wherein the one or more inputs include a first input and a second input, wherein a value of the first input is defined in a first test vector and a value of the second input is undefined in the first test vector;

wherein the one or more computational elements are configured to:

determine intermediate values and output values that are derived only from the value of the first input for the first test vector;

determine coverage of one or more functional characteristics of each of the one or more functions dependent on only the value of the first input for the first test vector; and validate the system output values determined from only the value of the first input for the first test vector.

10. The system of claim 9, wherein a value of the first input is defined in a second test vector and a value of the second input is defined in the second test vector;

wherein the one or more computational elements are configured to:

determine intermediate values and output values that are derived only from the value of the first input and the value of the second input for the second test vector;

determine coverage of one or more functional characteristics of each of the one or more functions dependent on only the value of the first input and the value of the second input for the second test vector; and validate the system output values determined from only the value of the first input for the second test vector and the value of the second input for the second test vector.

11. The system of claim 8, wherein the one or more computational elements are configured to mark inputs that are not defined in the one or more test vectors as undefined; and wherein the inputs marked as undefined are not used by the one or more computational elements to determine intermediate values and output values that are derived only from defined system inputs for the one or more test vectors.

12. The system of claim 11, wherein one or more computational elements are configured to mark outputs as defined only if the outputs are determined from the defined system inputs for the one or more test vectors or if the system under test provides the system outputs without consideration of system input.

13. The system of claim 8, wherein the one or more test vectors include multiple test vectors, wherein the one or more computational elements are configured to determine intermediate values and output values that are derived only from defined system inputs for the one or more test vectors based upon a history of values of the defined system inputs over time for the multiple test vectors.

14. The system of claim 8, wherein the one or more computational elements are further configured to output the determined coverage of one or more functional characteristics of each of the one or more functions dependent on only the defined system inputs and results of the validation in a report.

15. The system of claim 8, wherein the one or more computational elements are configured to determine system intermediate values and system output values that are derived only from defined system inputs for the one or more test vectors by:

collecting all specified system input values for the defined system inputs;

marking the specified system input values as unpropagated;

passing unpropagated system input values to functions of the system under test in topological order;

determining respective system intermediate values of each respective function of the system under test generated using respective specified values of subset of inputs propagated to the respective function in each step of execution;

marking inputs of a respective function as propagated if a respective intermediate value is determined for the respective function;

removing propagated system input values and propagated intermediate values from further analysis; and marking the determined intermediate values of functions as unpropagated for inputs to other functions in topological order.

16. A system, comprising:

one or more processors; and a non-transitory, computer readable medium communicatively coupled to the one or more processors, wherein the non-transitory, computer readable medium stores instructions which, when executed by the one or more processors, cause the one or more processors to:

receive one or more test vectors based on requirements for a system under test, wherein the system under test includes one or more inputs, one or more functions configured to a generate respective intermediate value based on a value of at least one of the one or more inputs, and one or more outputs configured to provide an output value based on at least one of the respective intermediate values;

determine system intermediate values and system output values that are derived only from input values defined in the one or more test vectors, wherein the input values defined in the one or more test vectors without consideration of assumed or default input values, wherein an input value for at least one input of the one or more inputs is undefined for at least one test vector of the one or more test vectors;

determine coverage of one or more functional characteristics of each function of the system under test executed based on the input values defined in the one or more test vectors; and validate the determined system output values that are derived only from the input values defined in the one or more test vectors.

17. The system of claim 16, wherein the one or more test vectors include multiple test vectors, wherein the non-transitory, computer readable medium stores instructions which, when executed by the one or more processors, cause the one or more processors to determine system intermediate values and system output values that are derived only from input values defined in the one or more test vectors based on a history of values of the defined system inputs over time for the multiple test vectors.

18. The system of claim 16, wherein the non-transitory, computer readable medium further stores instructions which, when executed by the one or more processors, further cause the one or more processors to:

mark system inputs that are other than the defined system inputs as undefined; and mark system outputs as defined only if the system outputs are determined from the defined system inputs or if the system under test provides the system outputs without consideration of system inputs.

19. The system of claim 16, wherein the non-transitory, computer readable medium further stores instructions which, when executed by the one or more processors, further cause the one or more processors to determine overall coverage of the system under test by combining coverage results from a plurality of test vectors.

20. The system of claim 18, wherein the non-transitory, computer readable medium further stores instructions which, when executed by the one or more processors, cause the one or more processors to determine system intermediate values and system output values that are derived only from input values defined in the one or more test vectors by propagating only the input values defined in the one or more test vectors and not undefined inputs.

* * * * *